United States Patent
Saishu et al.

[11] Patent Number: 6,069,600
[45] Date of Patent: May 30, 2000

[54] ACTIVE MATRIX TYPE LIQUID CRYSTAL DISPLAY

[75] Inventors: Tatsuo Saishu, Yokohama; Haruhiko Okumura, Fujisawa; Kohki Takatoh, Yokohama; Hiroyuki Nagata, Yokohama; Kouhei Suzuki, Yokohama; Masahiko Akiyama, Tokyo; Yujiro Hara, Yokohama; Hisao Fujiwara, Yokohama; Rieko Iida, Yokohama, all of Japan

[73] Assignee: Kabushiki Kaisha Toshiba, Kawasaki, Japan

[21] Appl. No.: 09/112,350

[22] Filed: Jul. 9, 1998

Related U.S. Application Data

[63] Continuation-in-part of application No. 08/835,020, Mar. 27, 1997.

[30] Foreign Application Priority Data

Mar. 28, 1996 [JP] Japan ..................................... 8-074467
Jul. 9, 1997 [JP] Japan ..................................... 9-184029

[51] Int. Cl.[7] ............................................... G09G 3/36
[52] U.S. Cl. .......................... 345/87; 345/205; 345/206
[58] Field of Search .................................. 345/87, 92, 98, 345/104, 205, 206

[56] References Cited

U.S. PATENT DOCUMENTS

| | | | |
|---|---|---|---|
| 5,051,739 | 9/1991 | Hayashida et al. | 340/784 |
| 5,627,557 | 5/1997 | Yamaguchi et al. | 345/90 |
| 5,691,783 | 11/1997 | Numao et al. | 349/348 |
| 5,793,344 | 8/1998 | Koyama | 345/87 |
| 5,949,396 | 9/1999 | Lee | 345/87 |

FOREIGN PATENT DOCUMENTS 8-15671  1/1996  Japan .

*Primary Examiner*—Richard A. Hjerpe
*Assistant Examiner*—Kimnhung Nguyen
*Attorney, Agent, or Firm*—Oblon, Spivak, McClelland, Maier & Neustadt, P.C.

[57] ABSTRACT

A pixel electrode is connected to a signal line via an n-channel TFT element for writing image signals and the pixel electrode is connected to an auxiliary storage capacitance line via p-channel TFT element for resetting the pixel electrode, wherein gate electrodes of the n-channel and p-channel TFT elements provided in a pixel region are commonly connected to a corresponding scanning line of the pixel region or to the corresponding scanning line and an adjacent scanning line, respectively.

18 Claims, 32 Drawing Sheets

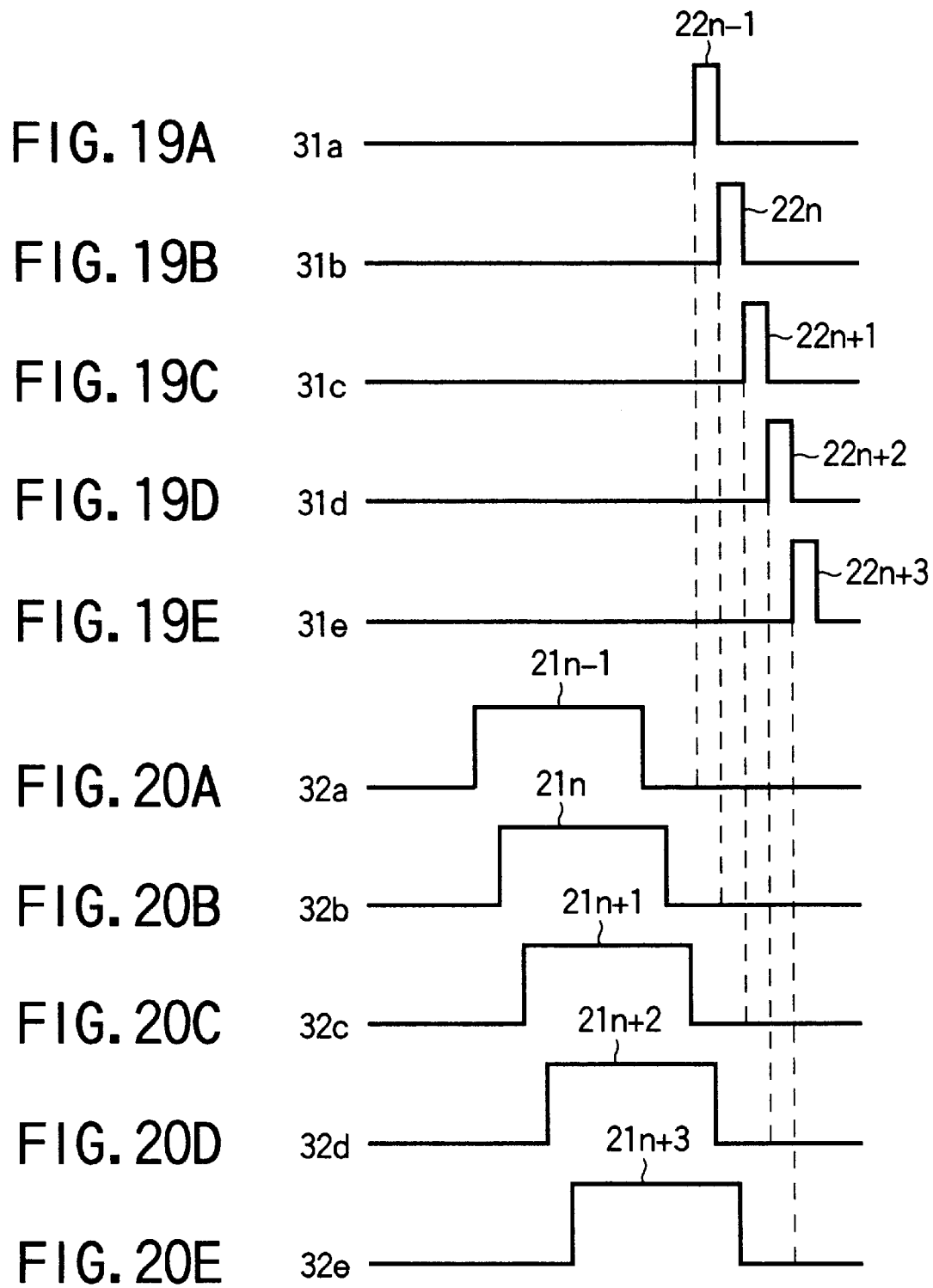

ACTIVE MATRIX TYPE LIQUID CRYSTAL DISPLAY

CROSS-REFERENCE TO RELATED APPLICATIONS

This is a Continuation-in-Part application of U.S. patent application Ser. No. 08/835,020 filed Mar. 27, 1997, the entire contents of which are incorporated herein by reference.

BACKGROUND OF THE INVENTION

The present invention relates to a liquid crystal display device using liquid crystal materials of chiral smectic C phase or sub-phase such as a ferroelectric liquid crystal or anti-ferroelectric liquid crystal thereof.

In the trend of higher definition and larger size of display screen of a liquid crystal display device, there is a strong demand for improvement of response speed and viewing angle of liquid crystal. One of the methods of meeting the demand is to use liquid crystal materials of chiral smectic C phase or its sub-phase.

As representative examples, ferroelectric liquid crystal or anti-ferroelectric liquid crystal are applied in the active matrix type liquid crystal display devices.

This kind of liquid crystal material is, however, known to induce spontaneous polarization, and to lower the holding voltage due to depolarization field when the response time of ferroelectric liquid crystal is longer than the writing time as a result of shortening of the writing time along with the trend of higher definition (see Hartmann: J. Appl. Phys. 66, 1132 (1989)). This lowering of holding voltage means so-called writing shortage, which leads to lowering of effective applied voltage and decline of contrast ratio, and large practical problems are effected.

Incidentally, in the case of alternating-current drive for driving in positive and negative symmetric modes by inverting polarity of the applied voltage in every frame, after a certain frame, when the absolute value of the signal voltage is changed largely, the holding voltage cannot follow up the signal voltage accurately. Hence, in the several subsequent frames, the brightness of the image corresponding to the signal voltage cannot be obtained, and while repeating lightness and darkness departing from the original brightness of the image, it finally settles at the stationary quantity of transmission light, which is known as step response (see Verhulst et al.: IDRC '94 digest, 377 (1994)). When such step response occurs, it is recognized as an after-image like a ghost with a tail, which is a practical problem.

On the other hand, in the case of an asymmetric mode, that is, direct-current drive, step response does not occur, and the contrast ratio is enhanced (see Tanaka et al.: SID '94 digest, 430 (1994)). However, as compared with the alternating-current drive, it is known to be lower in the response speed. The cause of decline of response speed is that writing is insufficient by one writing only, that is, that the holding voltage is lowered, and the response speed is lower as the writing time is shorter. In direct-current drive, the contrast ratio and response speed of image are in trade-off relation, and an optimum design is necessary to obtain sufficient values in both, but the available margin is narrow. Besides, problems of image sticking due to impurities or after-image due to residual hysteresis can be hardly solved by improving the driving method.

Thus, in either symmetric mode (alternating-current drive) or asymmetric mode (direct-current drive), writing shortage due to lowering of holding rate induces serious problems practically.

As measures against lowering of holding rate on the characteristic aspect of the liquid crystal material, increase of response speed and decrease of spontaneous polarization can be considered. The problems can be solved by using a liquid crystal material sufficiently high in speed and shorter in response time than in writing time in low voltage drive or in a temperature range slightly lower than the ordinary temperature, but the liquid crystal material satisfying these conditions is not known at the present. It is also regarded less likely, even in future, to realize high response speed in low temperature region, in particular.

The liquid crystal display device is further demanded to be larger in display size and higher in definition, and it is consequently required to shorten the writing time per line. Therefore, owing to the limit in enhancement of speed in liquid crystal material, it is hard to solve the above problems.

Still more, decrease of spontaneous polarization leads, in principle, to decline of response speed, and hence the problems are not solved. Thus, improvement of characteristics by liquid crystal material is insufficient as the measure for solving the problem of decline of holding voltage.

Alternatively, it may be considered to improve by the driving method or circuit structure. First, a method of increasing the storage capacitance may be considered. The storage capacitance value of active matrix type liquid crystal display element using an ordinary TN liquid crystal is nearly same as the capacity value between the pixel electrode and counter electrode filled with liquid crystal, but by increasing it 10 times or more, the problem of decline of holding voltage can be solved. However, as far as the response speed of the liquid crystal is as low as the present level, the problem of step response is not solved. Besides, along with increase of the storage capacitance, the current value also increases accordingly, and the power consumption is increased, and the load of the drive circuit is larger. It is hence not suited to practical use, and applications are limited.

As other means of solving, a method of writing a voltage near 0 V just before writing, and resetting by erasing or canceling the previously held electric charge is known. An active matrix driving method using TFT (thin film transistor) or TFD (thin film diode) is proposed in Jpn. Pat. Applin. KOKAI publication No. 7-64056, and in these methods, a part of writing time is assigned for reset action. Accordingly, the problem of step response is solved, but the practical writing time is shorter unless the number of lines is decreased, and sufficient improvement of contrast is not expected. Or, if the writing time is shortened due to heightened definition, the writing time becomes much shorter due to reset action, and writing shortage becomes a serious problem. In these methods, a sufficient reset time is not provided, and resetting is only imperfect, and hence it is impossible to eliminate step response completely. In particular, when changed from dark state to bright state, the luminance of the first frame is too high.

In order to obtain a sufficient reset time and reset completely, a circuit structure having two pieces each of TFD and signal line per pixel is reported (see Verhulst et al.: IDRC '94 digest, 377 (1994)). In this reported example, it is possible to reset while writing in other line. However, the number of elements and number of wires per pixel are too many and the driving waveform is complicated, and there are problems in the manufacturing yield and cost. Besides, with the TFD, it is hard to suppress fluctuations of the element characteristics of the entire liquid crystal display device, and it is not suited to practical use.

Moreover, Jpn. Pat. Applin. KOKAI publication No. 8-15671 discloses a liquid crystal display device in which reset lines are provided parallel to signal lines, and pixel electrodes and reset lines are connected with TFT. In this example, however, excessive reset wires are impeding enhancement of definition, and the aperture ratio is lowered and hence the luminance is lowered.

As described above, in the conventional active matrix type liquid crystal display device using ferroelectric liquid crystal or anti-ferroelectric liquid crystal, so far, no constitution is known to satisfy all of contrast ratio, image response speed, aperture ratio, and luminance at high levels.

It is hence an object of the present invention to provide a liquid crystal display device having high contrast ratio and high luminance, without causing after-image or uneven display, by using ferroelectric liquid crystal or anti-ferroelectric liquid crystal as liquid crystal material.

BRIEF SUMMARY OF THE INVENTION

The active matrix type liquid crystal display device of the present invention relates to an active matrix type liquid crystal display element using a liquid crystal material of chiral smectic C phase or its sub-phase and a thin film transistor, comprising an active matrix type liquid crystal display element using chiral smectic C phase or its sub-phase as liquid crystal material and thin film transistors, comprising:

a signal writing TFT element composed of p-channel or n-channel thin film transistor, connected between a signal line and a pixel electrode; and a resetting TFT element composed of a thin film transistor of a different channel from the signal writing TFT element, connected between the pixel electrode and a storage capacitance line.

A preferred embodiment of the present invention is described below.

The signal writing TFT element is an n-channel thin film transistor, and the resetting TFT element is a p-channel thin film transistor.

A preferred driving method of the liquid crystal display element of the present invention is described below.

A signal is written in by applying a voltage in scanning lines so as to turn on only the signal writing TFT element of a certain pixel line, and, at the same time, a plurality of pixel lines are reset by applying a voltage in scanning lines so as to turn on only the switching TFT element of a plurality of pixel lines different from the certain pixel line.

The invention relates to an active matrix type liquid crystal display element using a liquid crystal material of chiral smectic C phase or its sub-phase which is a representative liquid crystal in which reset driving is effective, comprising an active matrix type liquid crystal display element using chiral smectic C phase or its sub-phase as liquid crystal material and thin film transistors, comprising:

a signal writing switching element connected among a first scanning line, a signal line and a pixel electrode, so as to be controlled by a selected first scanning line, and a resetting switching element connected among a second scanning line, the pixel electrode, and a storage capacitance, so as to be controlled by a selected second scanning line.

As a liquid crystal material other than the chiral smectic C phase or its sub-phase in which reset driving is effective, a polymer-dispersed liquid crystal material having a hysteresis in the voltage-light transmission characteristic and a cholesteric liquid crystal material may be used. However, in view of the response speed thereof, the chiral smectic C phase or its sub-phase is preferable.

A preferred embodiment of the present invention is described below.

The second scanning line or lines which belong to one or a plurality of pixel lines are connected to first scanning lines which belong to different one or a plurality of pixel lines.

A pixel line pixel row is a set of pixels in which image signals are written simultaneously from signals lines when the first scanning line is selected.

The second scanning line may be connected to the first scanning line through a diode.

The second scanning line is connected to the first scanning line on a substrate. That is, only the terminal of the first scanning line to be connected to a driving IC is provided on the substrate, and terminal of second scanning line is not formed.

It is a feature that driving circuits of the first and second scanning lines and signal lines driving circuit may be formed on an array substrate.

The first scanning lines and second scanning lines are respectively connected to different driving ICs, from the array substrate end or the terminal provided at the same side or different side of the substrate end of a peripheral circuit of the array substrate.

A preferred driving method of the liquid crystal display element of the present invention is described below.

A signal is written in by applying a voltage in the first scanning line so as to turn on only the signal writing switching element of a certain pixel line, and, at the same time, a plurality of pixel lines are reset by applying a voltage in the second scanning line so as to turn on only the resetting switching element of one or a plurality of pixel lines different from the certain pixel line.

To one pixel electrode, an end of the signal writing TFT element and an end of the resetting TFT element are connected, while the other ends are connected respectively to a signal line and a storage capacitance line. Two TFT elements in the same row can be controlled independently, so that signal writing action and reset action can be done independently.

Therefore, by writing the signal by the signal writing TFT to which the signal line and pixel electrode are connected, and by resetting by the resetting TFT to which the storage capacitance line and pixel electrode are connected, in each pixel, resetting is done before signal writing, and therefore the conventional problems of contrast drop and step response can be solved.

Moreover, by resetting several other lines simultaneously with writing signal in one line, the resetting effect is further enhanced, and the contrast is improved, so that the step response can be eliminated completely.

Incidentally, when connecting the storage capacitance line through the resetting TFT element to the pixel electrode the storage capacitance line belonging to either the same line or an adjacent line to the pixel to be reset is connected, or it is connected to the storage capacitance line wired in a direction intersecting with the scanning line, or other methods may be considered.

When resetting the voltage applied to the pixel to a voltage near 0 V by setting at the same potential as the counter electrode potential by hardly moving the storage capacitance line potential at the time of resetting, the resetting TFT is connected to the storage capacitance line belonging to the line adjacent to the pixel to be reset, or it may be connected to the storage capacitance line wired in a direction intersecting with the scanning line, so that the aperture ratio may be heightened.

Or, when resetting the voltage applied to the pixel to other voltage than 0 V, for example, saturation voltage of the liquid crystal material or a voltage about ½ of saturation voltage, by moving the storage capacitance line potential at the time of resetting, it is preferred to connect the resetting TFT to the storage capacitance line belonging to the same line as the pixel to be reset.

Actions and effects of the invention are described below.

According to the invention, lowering of aperture ratio occurs in the area of one TFT element only, and it is more advantageous than the conventional method of increasing the number of wires.

It is preferred to use the n-channel TFT element higher in mobility as the signal writing TFT element, and use the p-channel TFT lower in mobility than the n-channel TFT element as the resetting TFT element, as compared with the reverse case. That is, a sufficient resetting time can be provided, while the signal writing time is limited by the number of lines. Therefore, the signal writing TFT element is preferred to be made of one superior in writing characteristic.

In this constitution of the present invention, since the conventional scanning line driving ICs can be used, the cost is not raised.

Besides, by connecting the second scanning line of one or a plurality of lines with the first scanning line of different row, the number of terminals connected to the scanning line driving IC is same as in the prior art not having the second scanning line, and the driving waveform to be fed into each scanning line terminal is same as in the prior art, and the resetting action is done automatically.

When the second scanning line is connected to the first scanning lines which is continuously scanned, by applying the same driving waveform as in the prior art, selected signals from the first scanning line are continuously applied to the second scanning line, and a plurality of lines are reset automatically, that is, a sufficient resetting time can be provided.

By respectively connecting the first scanning line and a plurality of second scanning lines through diodes, a plurality of lines can be reset independently and simultaneously with writing of signals, and the quality of display image can be maintained.

By composing the circuit so that the first scanning line and one or a plurality of the second scanning lines may be branched off from one terminal at the array substrate end, conventional components can be utilized in both peripheral circuit substrates and scanning line driving IC, and hence cost increase is not required at all.

Moreover, by resetting several other lines while writing signal in one line, the resetting effect is further enhanced, the contrast is improved, and step response can be eliminated completely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 19A to 19E and 20A to 20E are waveforms inputted into the liquid crystal display device in the fifth embodiment.

DETAILED DESCRIPTION OF THE INVENTION

Figure 1A:
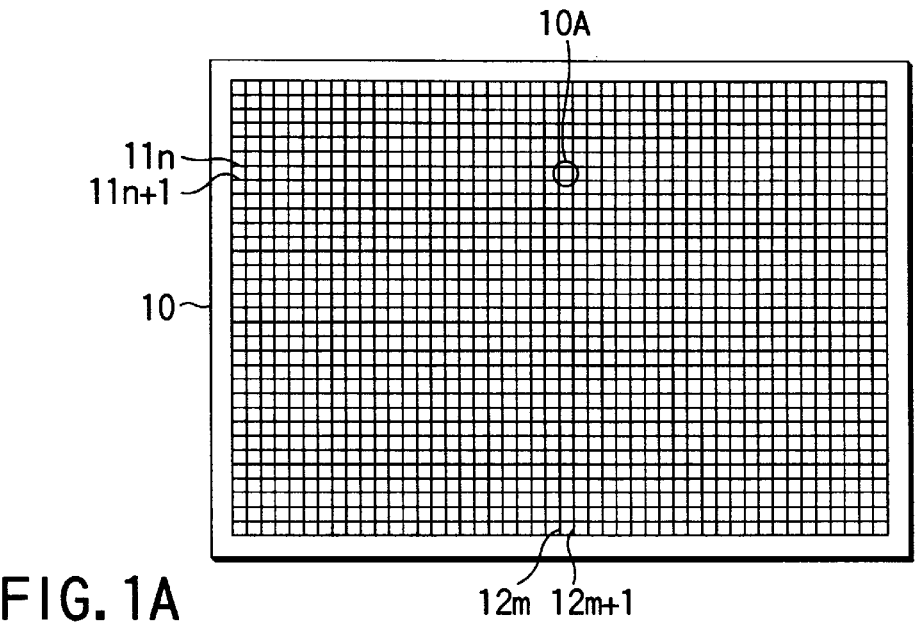
FIG. 1A is a plan view showing an array substrate of a liquid crystal display element in a first embodiment of the present invention.

Referring now to the drawings, preferred embodiments of the present invention are described specifically below. It must be noted however that these embodiments are presented only for the purpose of ease of understanding of the present invention, and may be modified or changed in various forms within the scope not departing from the true spirit of the present invention.

First is described an embodiment of a liquid crystal display device in which two TFT elements, n-channel TFT element and p-channel TFT element, are connected to a pixel electrode.

[First Embodiment]

FIG. 1A is a diagram schematically showing a matrix pixel layout of a TFT array substrate 10 of an active matrix type liquid crystal display device according to the invention, in which one pixel region 10A is divided by two scanning lines 11$n$, 11$n$+1 in the row direction, and is divided by two signal lines 12$m$, 12$m$+1 in the column direction. Other pixel regions are formed similarly.

In the liquid crystal display device of the present invention, pixel regions 10A forming TFT elements and pixel electrodes in FIG. 1A are arranged in a matrix on the TFT array substrate 10, on which a CF substrate forming a counter common electrode through a liquid crystal material of chiral smectic C phase or its sub-phase as explained later is arranged to compose the device.

On a practical TFT array substrate 10, pixels or pixel regions of 640×480 (VGA) are arranged in a matrix. In the case of a color liquid crystal display device explained below, one pixel is composed of three sub-pixels corresponding to the three primary colors.

Figure 1B:
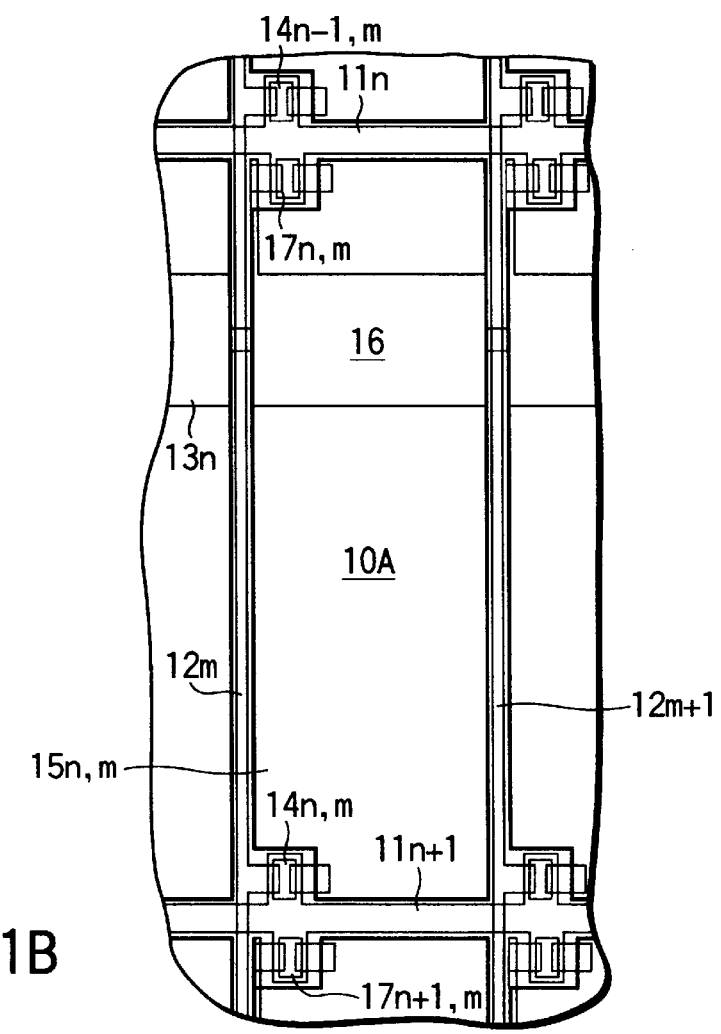
FIG. 1B is a magnified plan view of composition of one pixel enclosed by a circle on the array substrate shown in FIG. 1A.
Figure 2A:
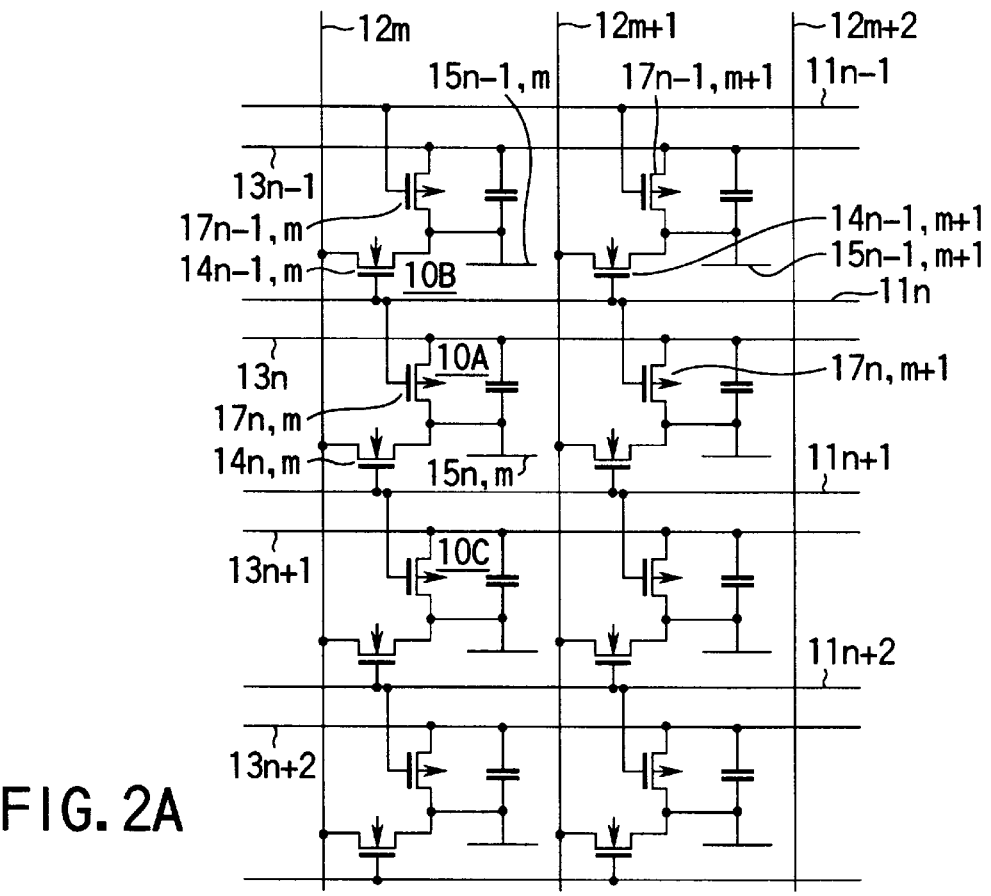
FIG. 2A is a diagram showing an equivalent circuit of the liquid crystal display device in the first embodiment.

FIG. 1B is a plan view showing the composition of a sub-pixel formed in the pixel region 10A on the TFT array substrate 10, and FIG. 2A is a circuit diagram showing an equivalent circuit corresponding to eight pixel regions of four rows and two columns of sub-pixel group.

As shown in FIG. 1B, two scanning lines 11$n$, 11$n$+1 are formed in the row direction, and two signal lines 12$m$, 12$m$+1 are formed in the column direction. At a position overlapping with the pixel electrode 15 formed between the scanning lines 11$n$ and 11$n$+1, a storage capacitance line 13$n$ is formed in the row direction, and a storage capacitance 16 is formed between the two.

A gate electrode of an n-channel TFT element 14$n$-1,$m$ formed in the upper pixel region adjacent to the pixel region 10A and a gate electrode of a p-channel TFT element 17$n$,$m$ formed in this region 10A are connected to the scanning line 11$n$. In the similar manner, a gate electrode of an n-channel TFT element 14$n$,$m$ formed in the pixel region 10A and a gate electrode of a p-channel TFT element 17$n$+1,$m$ formed in the lower adjacent region 10C are connected to the scanning line 11$n$+1.

The signal line 12$m$ is connected to a pixel electrode 15 through the n-channel TFT element 14$n$,$m$.

The pixel electrode 15 is connected to the storage capacitance line 13$n$ through the storage capacitance 16. The pixel electrode 15 is also connect ed to the storage capacitance line 13$n$ of the same row through a p-channel TFT element 17$n$,$m$. In this embodiment, the n-channel TFT element 14$n$,$m$ is connected to the scanning line 11$n$+1, and the gate electrode of the p-channel TFT element 17$n$,$m$ connected to the same pixel electrode 15 is connected to the scanning line 11$n$. All n-channel and p-channel TFT element s on the array substrate 10 are formed similarly.

The semiconductor layer of each TFT element is made of a-Si. The n-channel and p-channel TFT elements (represented by numerals 14 and 17) are formed so that the difference of the threshold voltages of both TFT elements 14, 17 may be more than two times the signal amplitude in driving, by properly adjusting the initial carrier concentration and layer thickness of a-Si, or the film thickness of the gate insulating film of the TFT element. In the driving system of the embodiment as described later, since the signal amplitude is ±3 V, the difference of the threshold voltage of the both TFT elements is set at 6 V or more.

According to the theoretical formula of TFT (Weiner: RCA Review, vol. 24 (1963), 153), the threshold voltage Vc is expressed as $$Vc = -qhn/C$$

where h: film thickness of a-Si n: initial carrier concentration of a-Si

C: gate capacity per unit volume (inversely proportional to film thickness of gate insulating film) Therefore, by adjusting these parameters, a desired threshold voltage can be obtained.

Moreover, the ratio of channel width/channel length (W/L) of the p-channel TFT element 17 is set larger than that of the n-channel TFT element 14. This is because the ON current of TFT element is proportional to both mobility and W/L, in the p-channel TFT element smaller in mobility, it is necessary to increase W/L so as to balance with the ON current of the n-channel TFT element.

Figure 2B:
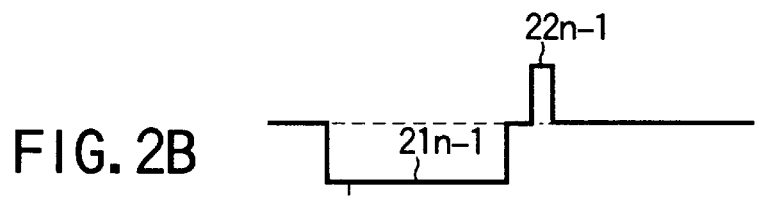
FIGS. 2B to 2E show diagrams of input waveforms applied to the scanning lines shown in FIG. 2A.
Figure 2C:
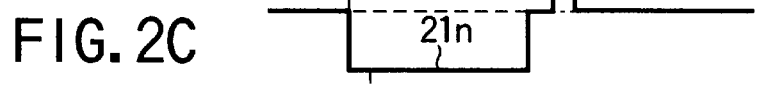
Figure 2D:
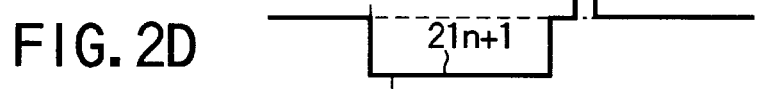
Figure 2E:
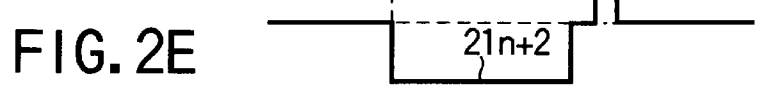
Figure 2F:
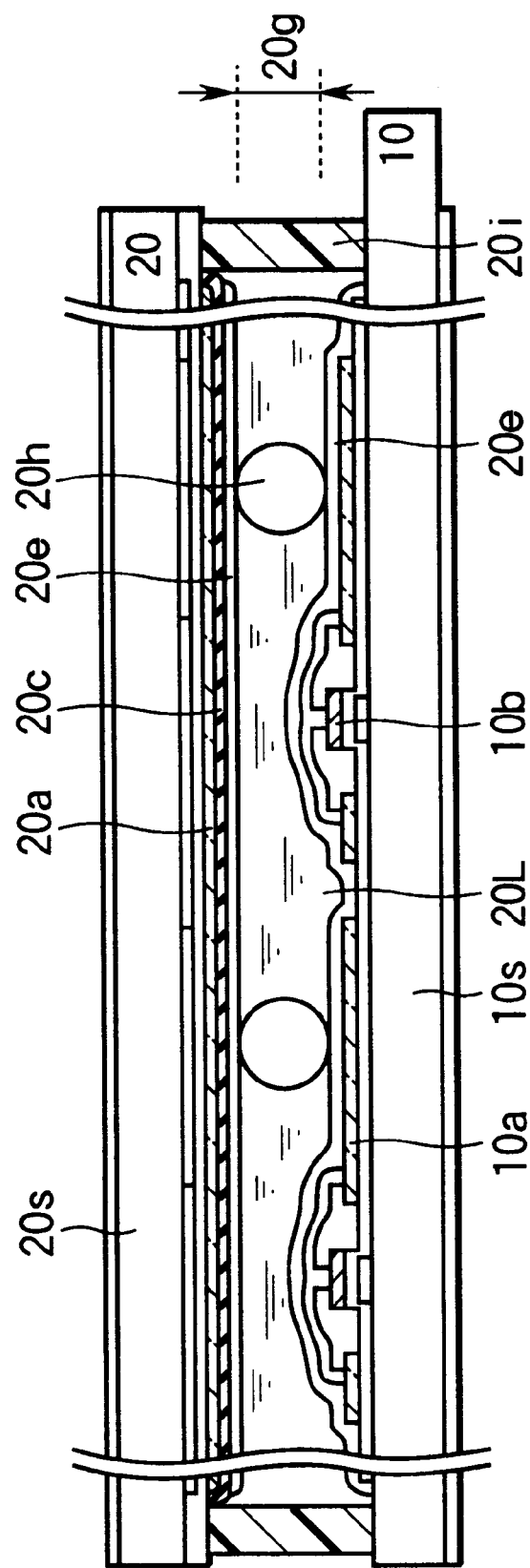
FIG. 2F shows a sectional view of the liquid crystal display device of the first embodiment.

The liquid crystal display device of the present embodiment was manufactured in the following method, and composed as shown in FIG. 2F. A counter electrode substrate or color filter (CF) substrate 20 is formed on a glass substrate 20S. A transparent electrode (ITO) 20$a$ is formed on the substrate 20. Portions of the transparent electrode 20$a$ corresponding to the signal lines and TFT elements formed on the opposite TFT array substrate 10 were removed by etching. Moreover, as an insulating film of a film thickness of 30 nm, an $SiO_2$ film 20c was formed by sputtering method.

On the ITO electrode (pixel electrode) of TFT array substrate 10 and $SiO_2$ layer 20c of the counter substrate 20, polyimide films 20e of low pre-tilting performance were formed as orientation alignment films of liquid crystal. The orientation films 20e of the substrates 10 and 20 were rubbed along the scanning line direction, reversely to the injection direction of the liquid crystal. Where, the rubbing axis of both substrates 10, 20 was deviated by about 10° each.

The cell gap 20g was defined at 2.0 μm by scattering resin-coated silica spacer 20h having a diameter of 2.0 μm between the TFT array substrate 10 and the counter substrate 20. The gap 20g should be defined less than 2.0 μm.

A liquid crystal material 20L is inserted between the substrates 10 and 20 and is sealed by a sealing resin 20i. As the liquid crystal material 20L, thresholdless anti-ferroelectric liquid crystal A (a product of Mitsui Petrochemical Industries) of spontaneous polarization of 200 $nC/cm^2$, response time of 100 μs, and saturation voltage of 4 V was used.

The driving system conformed to the VGA (upper and lower two-division drive system for 640*480 pixels) of maximum applied voltage of ±3 V and selection time of one line of 64 μs is used. In each scanning lines 11n, 11n+1, 11n+2 and 11n+3 shown in FIG. 2A, a scanning line driving signals having waveforms shown in FIGS. 2B to 2E were applied. Storage capacitance lines 13n, 13n+1, 13n+2 and 13n+3 are formed in correspondence with the scanning lines 11n, 11n+1, 11n+2 and 11n+3.

For example, negative and positive pulse signals 21n and 22n as shown in FIG. 2B are applied sequentially to the scanning line 11n. By the negative pulse signal 21n on the scanning line 11n, the p-channel TFT element 17n,m for resetting the liquid crystal in the pixel region 10A is first turned on and then the n-channel TFT element 14n–1,m for signal writing in the upper adjacent pixel region 10B is turned on by the signal writing pulse 22n. The reset pulses 21n to 21n+3 are delayed to be partially overlapped with each other on the scanning lines, and a sufficient reset time is maintained by setting the pulse width at about 250 μs, respectively.

Generally, it takes a longer time in resetting (falling, discharging) than in signal writing (rising, charging) in liquid crystal, and hence the reset pulse must be longer than the write pulse. The fall response time of liquid crystal (time required for discharge) is the lower limit of reset pulse width, and practically it is about 250 μs in consideration of the dependence on liquid crystal material and dependence on temperature.

When the reset pulse 21n is fed into the scanning line 11n, all the n-channel TFT elements (two elements 14n–1,m and 14n–1,m+1 are shown in FIG. 2A) connected to the line 11n remain in off state, while all the p-channel TFT elements (two elements 17n,m and 17n,m+1 are shown in the figure) connected to the pixel one line below are turned on.

For example, when the p-channel TFT element 17n,m is turned on in the pixel region 10A, the pixel electrode 15n,m is connected to the storage capacitance line 13n. The storage capacitance potential is fixed to the counter common electrode potential, and resetting is done by setting the voltage applied to the pixel to a voltage near 0 V.

At this time, all the p-channel TFT elements connected to the scanning line 11n are turned on and the potentials of all the pixel electrodes connected thereto are set to that of the storage capacitance line 13n.

Now, the resetting operation of the present embodiment will be described by referring to FIG. 3. In the embodiment, the potential Vcs of the storage capacitance line 13n is maintained at a predetermined value similar to the potential Vcom of the counter electrode or common electrode.

Figure 3:
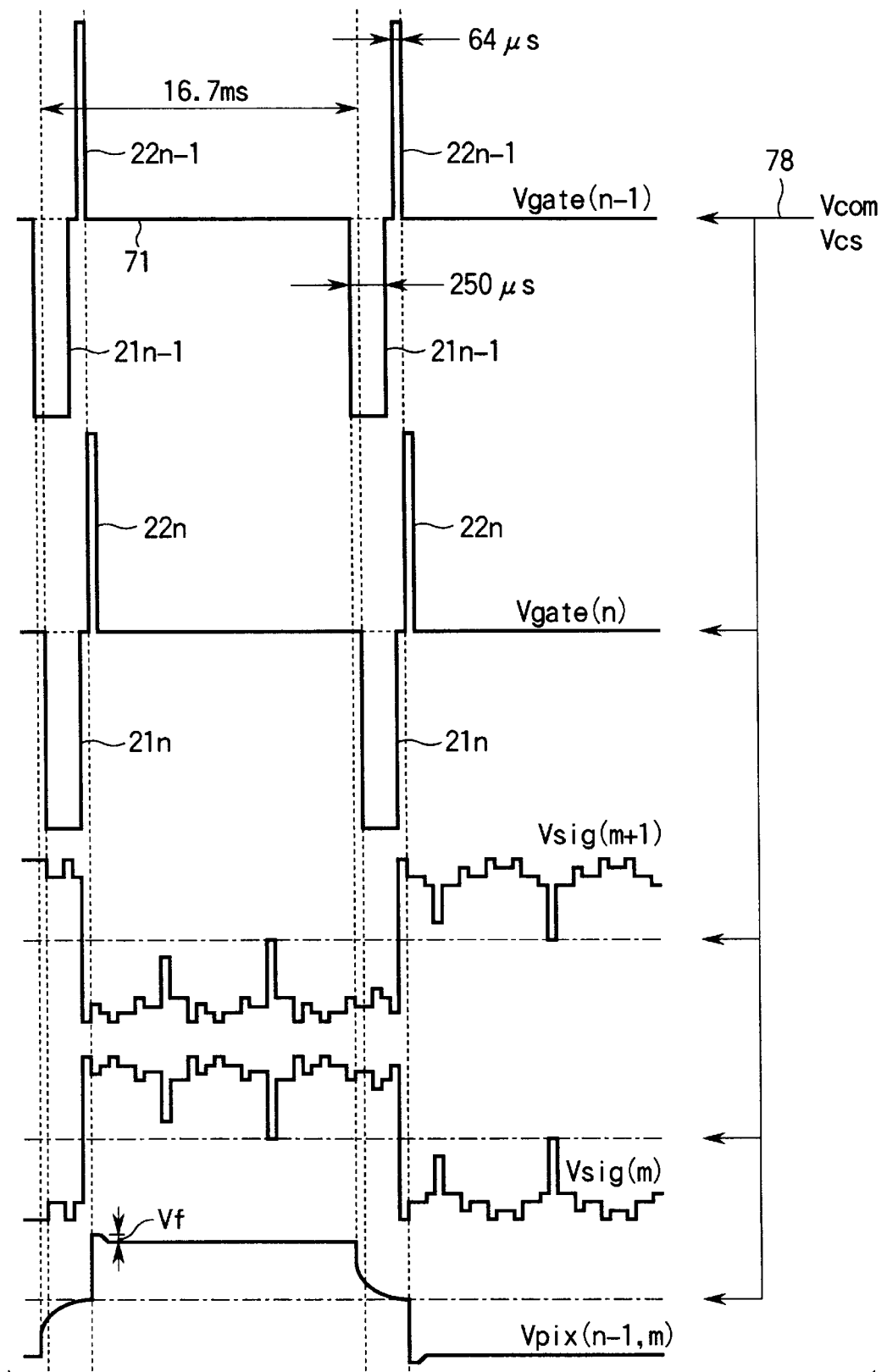
FIG. 3 shows signal waveforms for explaining the operation of the first embodiment device.

In FIG. 3, the potential of the n-th gate line in FIG. 2A or the scanning line 11n is set as Vgate(n), that of the m-th signal line 12m as Vsig(m), and that of the pixel electrode 15n,m in the pixel region 10A at a position of n-th row and m-th column as Vpix(n,m). In the similar manner, the potential of the pixel electrode 15n–1,m in the pixel region 10B positioned at n-1-th row and m-th column is defined as Vpix(n–1,m).

When a reset pulse 21n–1 is first supplied to the scanning lie 11n–1, all the p-channel TFT elements including those 17n–1,m and 17n–1,m+1 are turned on and the potentials of the pixel electrodes 15n–1,m and 15n–1,m+1 are reset to that of the storage capacitance line 13n.

When the p-channel TFT element 17n,m for resetting the potential is turned on by the resetting pulse 21n generated slightly after the resetting pulse 21n–1, the pixel electrode 15n,m and the storage capacitance line 13n are short-circuited via the p-channel TFT element 17n,m, so that the potential of the pixel electrode 15n,m is reset to that Vcs of the storage capacitance line 13n or to that Vcom of the counter electrode.

In succession, by the signal writing pulse 22n, all the n-channel TFT elements including the elements 14n–1,m and 14n–1,m+1 connected to the upper adjacent scanning line 11n are turned on, and the p-channel TFT elements including the elements 17n,m and 17n,m+1 are turned off, and the image is displayed as the image signal depending on the gradation of the image is fed from the signal line 12m into the pixel electrode 15n–1,m or to the pixel electrode 15m,n.

The image signals Vsig(m) and Vsig(m+1) entered from the signal lines 12m and 12m+1 have reversed polarities with each other and reversed at every frame. These signals are alternating currents about the counter electrode potential Vcom or Vcs, and the image is displayed by driving by the signal line to invert the signal polarity in each row, in each frame.

As shown in FIG. 3, the potential vpix(m,n) of the pixel electrode 15m,n is set to the potential Vcs of the storage capacitance line 13m when the TFT 17m,n is turned on according to the reset pulse 21. An image signal is then written by the signal writing pulse 22n and the potential Vpix(m,n) of the pixel electrode is raised. Just after the pulse 22n the potential of the Vpix(m,n) is instantly decreases by the value Vf as shown in FIG. 3 due to the dielectric moderation phenomenon. After that, the potential is maintained constant.

As a result of image display, the contrast ratio was 70:1, and the response speed was 1 ms or less, and there was no afterimage due to a step response.

Figure 4:
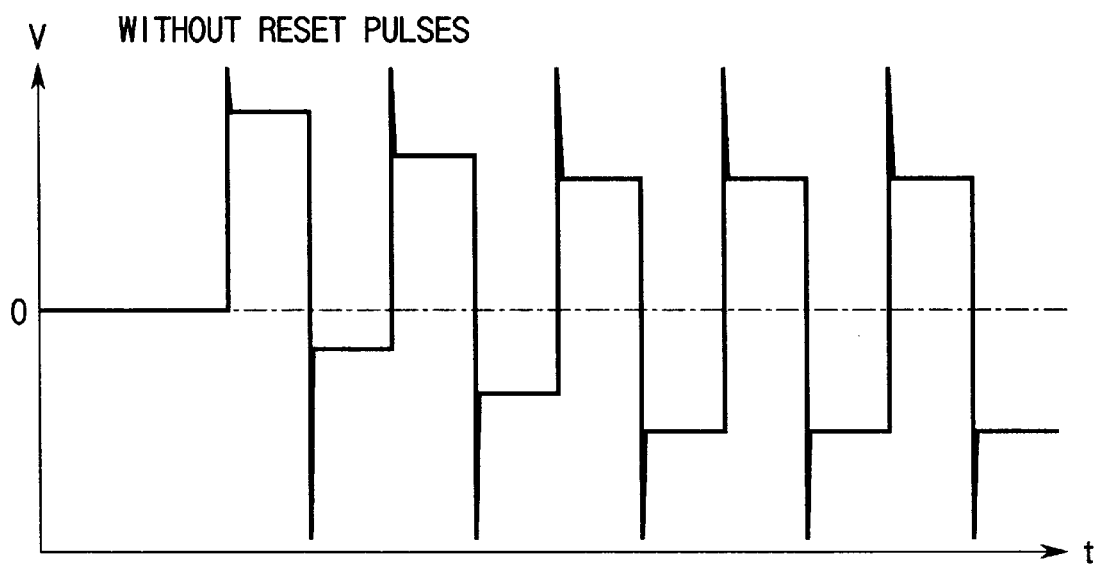
FIGS. 4 and 5 show pixel voltage and optical response waveforms of a liquid crystal material when no reset pulse is applied to the device.
Figure 5:
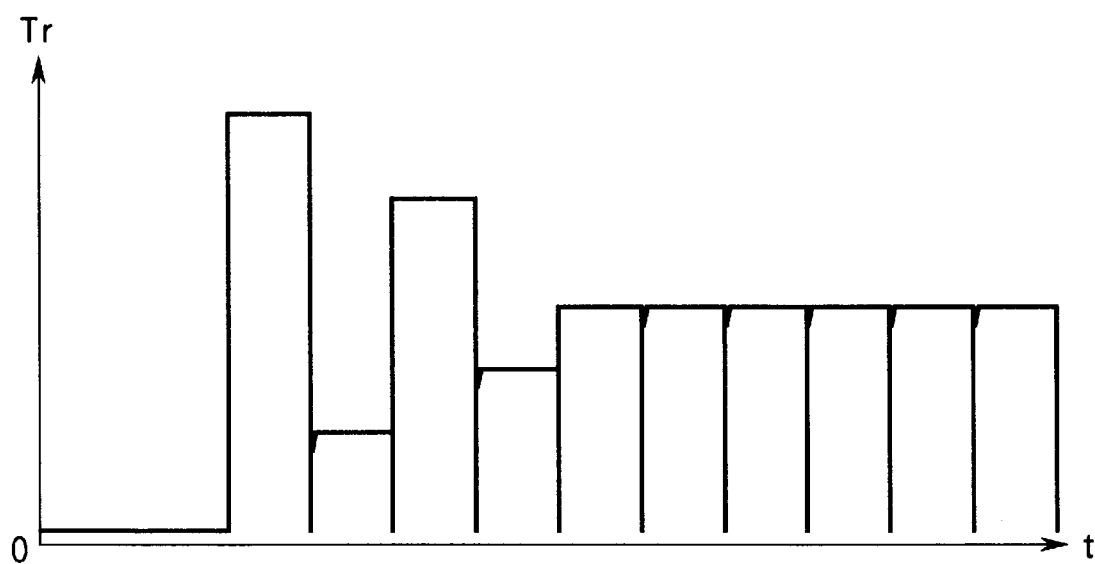

Now, the step response will be described in detail. For the sake of comparison, the potential change in each frame without resetting the pixel electrode potential by the reset pulse is shown in FIG. 4. As can be seen clearly from FIG. 4, the potential of the pixel electrode is deviated for several frames from the reference revel Vcs=0. Due to the potential deviation of the pixel electrode, the transparency of the liquid crystal is largely changed for every frame as shown in FIG. 5, and the lightness of the display screen changes between light side and dark side. This phenomenon is called as a step response. For example, when an image of a white object moves in a black background in the display screen, and when the transparency of the liquid crystal is large with respect to a standard image signal, the black background does not become sufficiently and a white afterimage will be observed.

Figure 6:
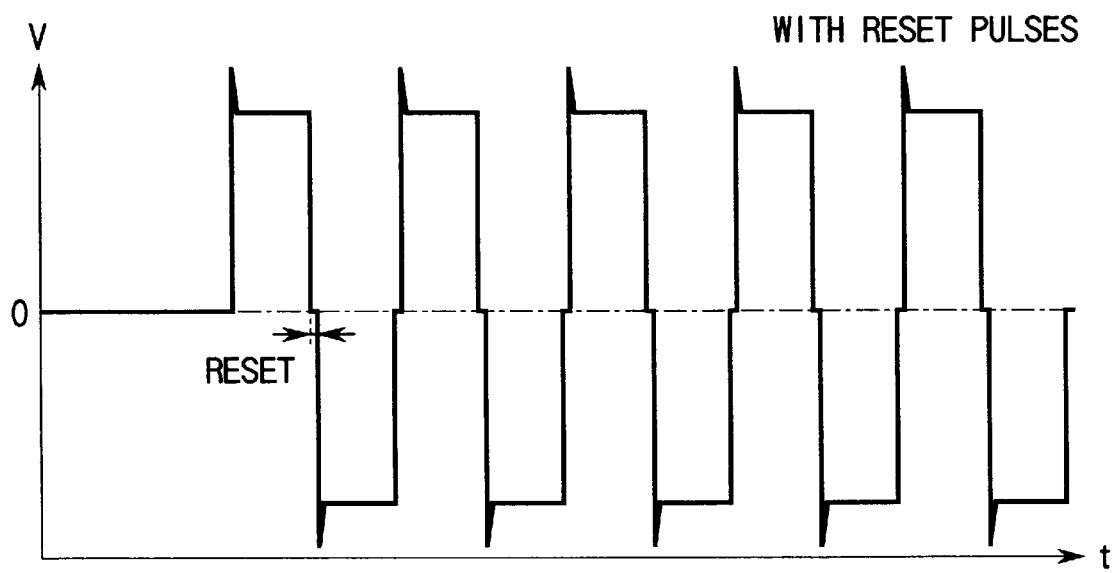
FIGS. 6 and 7 show pixel voltage and optical response waveforms of a liquid crystal material when a reset pulse is applied to the device.
Figure 7:
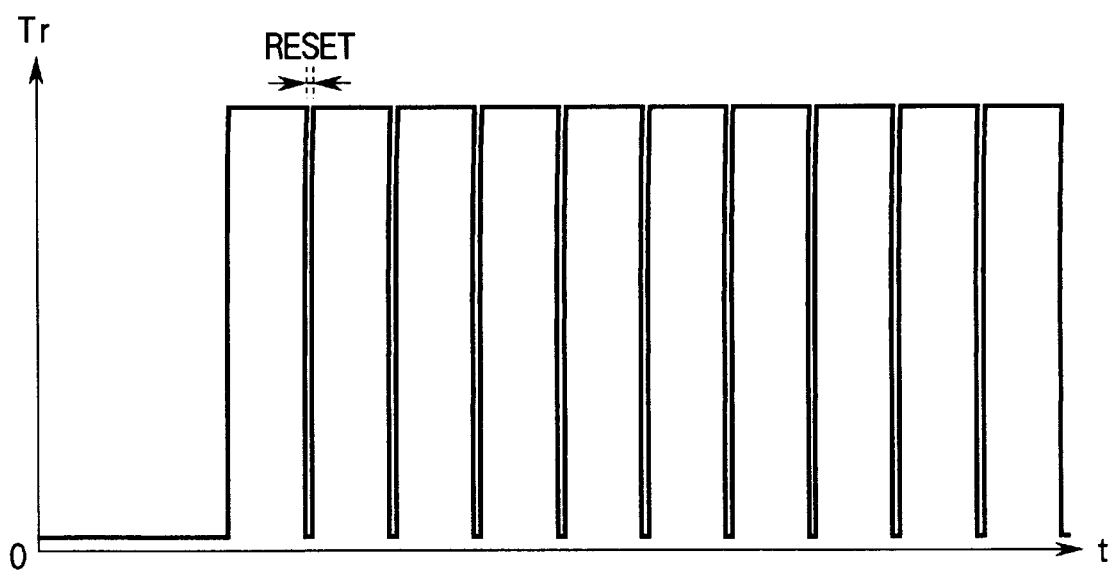

On the contrary, when the potential of the pixel electrode is reset by using the reset pulses, no deviation can be observed in the pixel electrode potential in each frame as shown in FIG. 6. In this case, the transparency of the liquid crystal is maintained constant as shown in FIG. 7 with the stable brightness in the entire screen and the quality of the display image was very good.

[Second Embodiment]

The liquid crystal display element of the embodiment is a display forming 640×480 (VGA) pixels on an array substrate.

Figure 8:
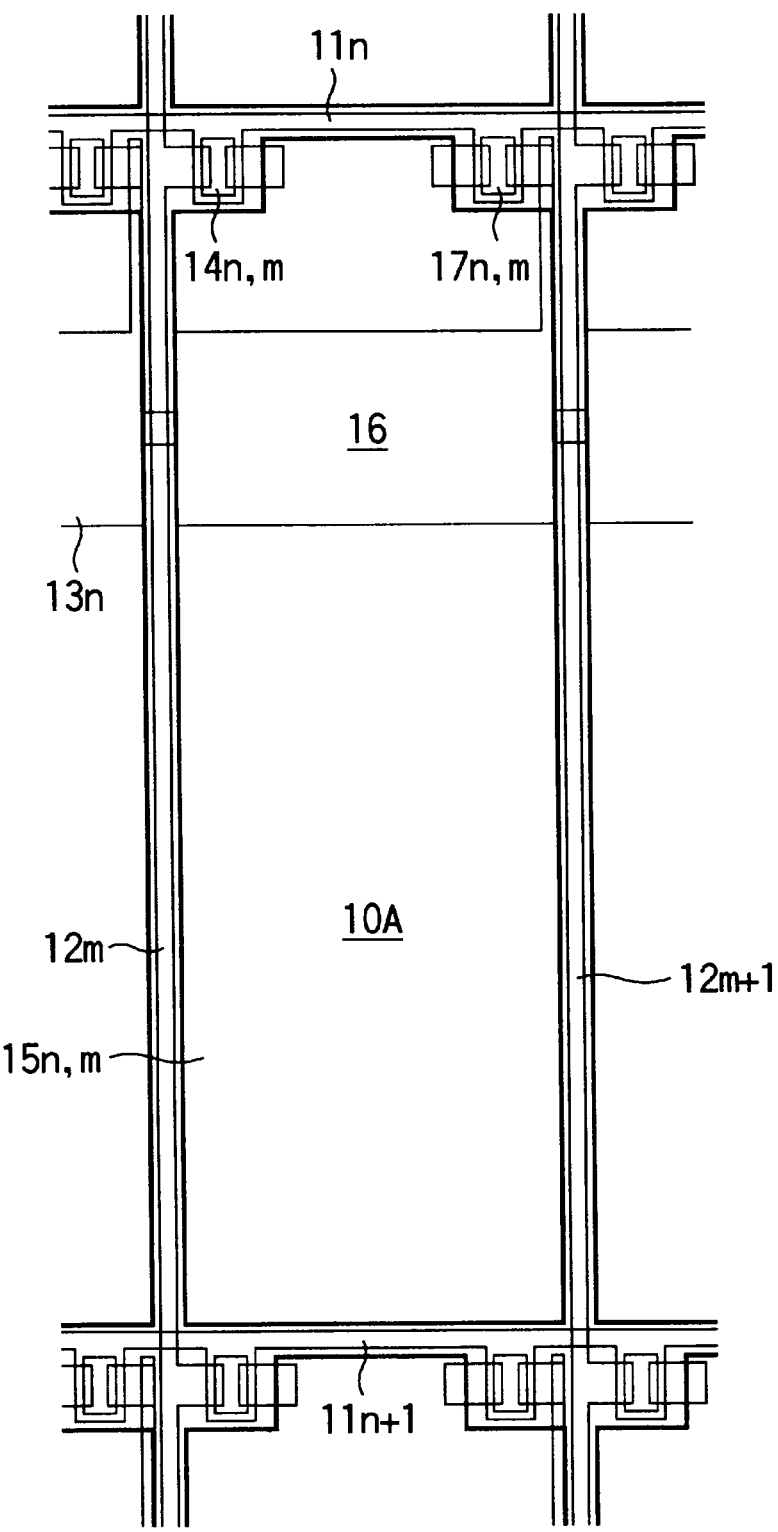
FIG. 8 is a plan view showing a pixel arrangement of an array substrate of a liquid crystal display device in a second embodiment.
Figure 9A:
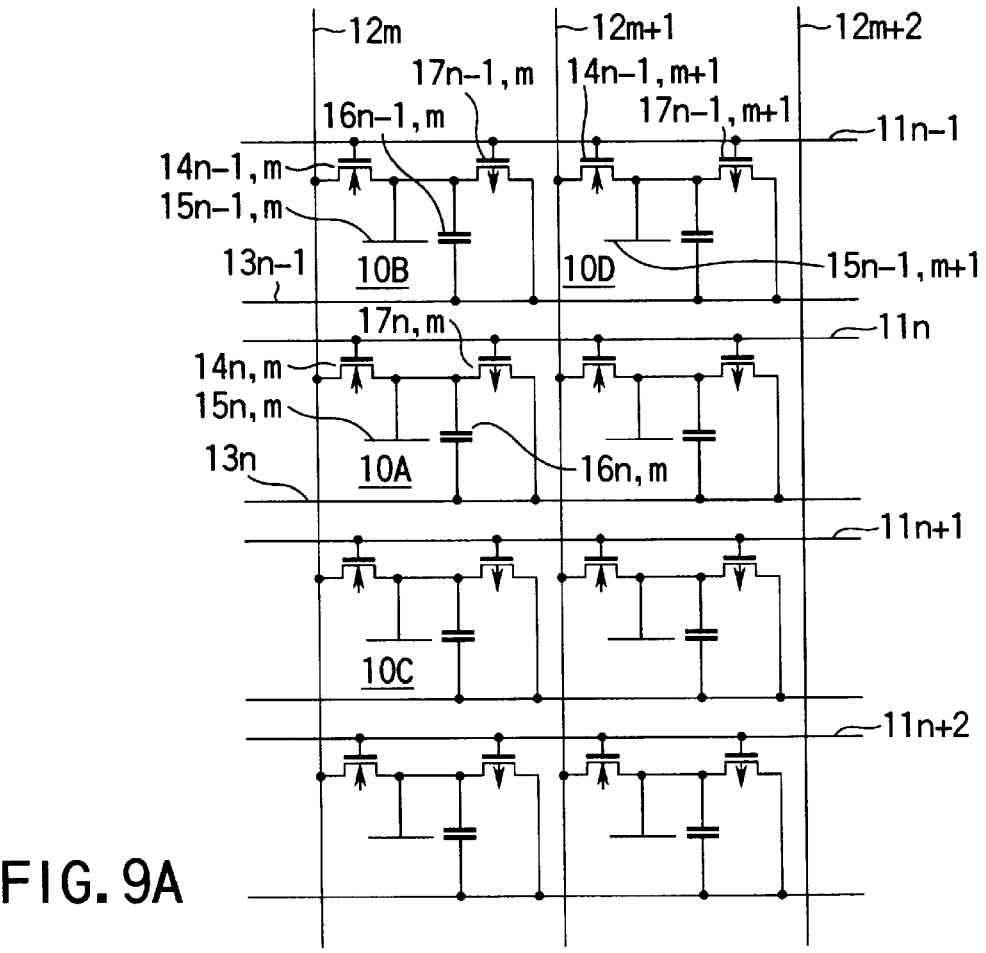
FIG. 9A is a diagram showing an equivalent circuit of the liquid crystal display device in the second embodiment.

FIG. 8 is a plan view showing the composition of sub-pixel on the TFT array in the same manner as in FIG. 1B. FIG. 9A is a circuit diagram showing an equivalent circuit of four lines and two rows of sub-pixel group in the same manner as in FIG. 2A.

In FIG. 8 and FIG. 9, same parts as in FIG. 1B and FIG. 2A are identified with same reference numerals, and their detailed description is omitted.

It is a feature of the embodiment that the gate electrodes of n-channel TFT element $14m,n$ and p-channel TFT element $17m$ connected to the same pixel electrode $15m,n$ are connected to the scanning line $11n$ of the same pixel line, and that the pixel electrode $15m,n$ is connected to the storage capacitance line $13n$ of the same pixel line through the p-channel TFT element $17m,n$.

A circuit diagram of 8 pixels included in 4 rows and 2 columns including a pixel region 10A is shown in FIG. 9A. For example, in each of the pixel regions 10B and 10D, n-channel TFT elements $14m,n-1$ and $14m+1,n-1$ and p-channel TFT elements $17m,n-1$ and $17m+1,n-1$ are connected to the scanning line $11n-1$.

Figure 9B:
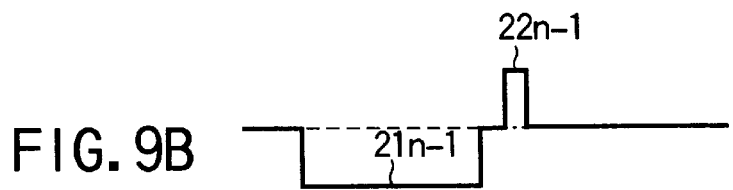
FIGS. 9B to 9E show diagrams of input waveforms applied to the scanning lines shown in FIG. 8.
Figure 9C:
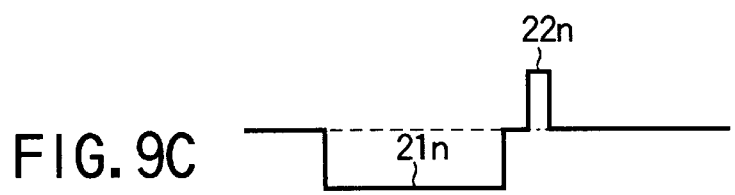
Figure 9D:
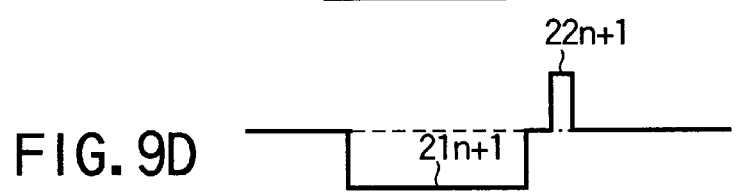
Figure 9E:
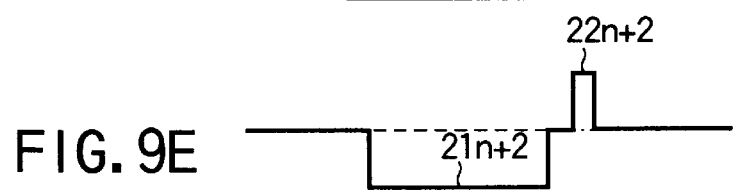

For instance, when a reset pulse $21n-1$ as shown in FIG. 9B is supplied to the scanning line $11n-1$, the p-channel TFT elements $17m,n-1$ and $17m+1,n-1$ are turned on so that the potentials of the pixel electrode $15m,n-1$ and $15m+1,n-1$ are reset. To the scanning lines $11n$, $11n+1$, $11n+2$ are supplied with reset pulses $21n$, $21n+1$ and $21n+2$ to reset the pixel electrode potentials, thereby enabling the operation of no step response as shown in FIGS. 6 and 7.

Figure 10A:
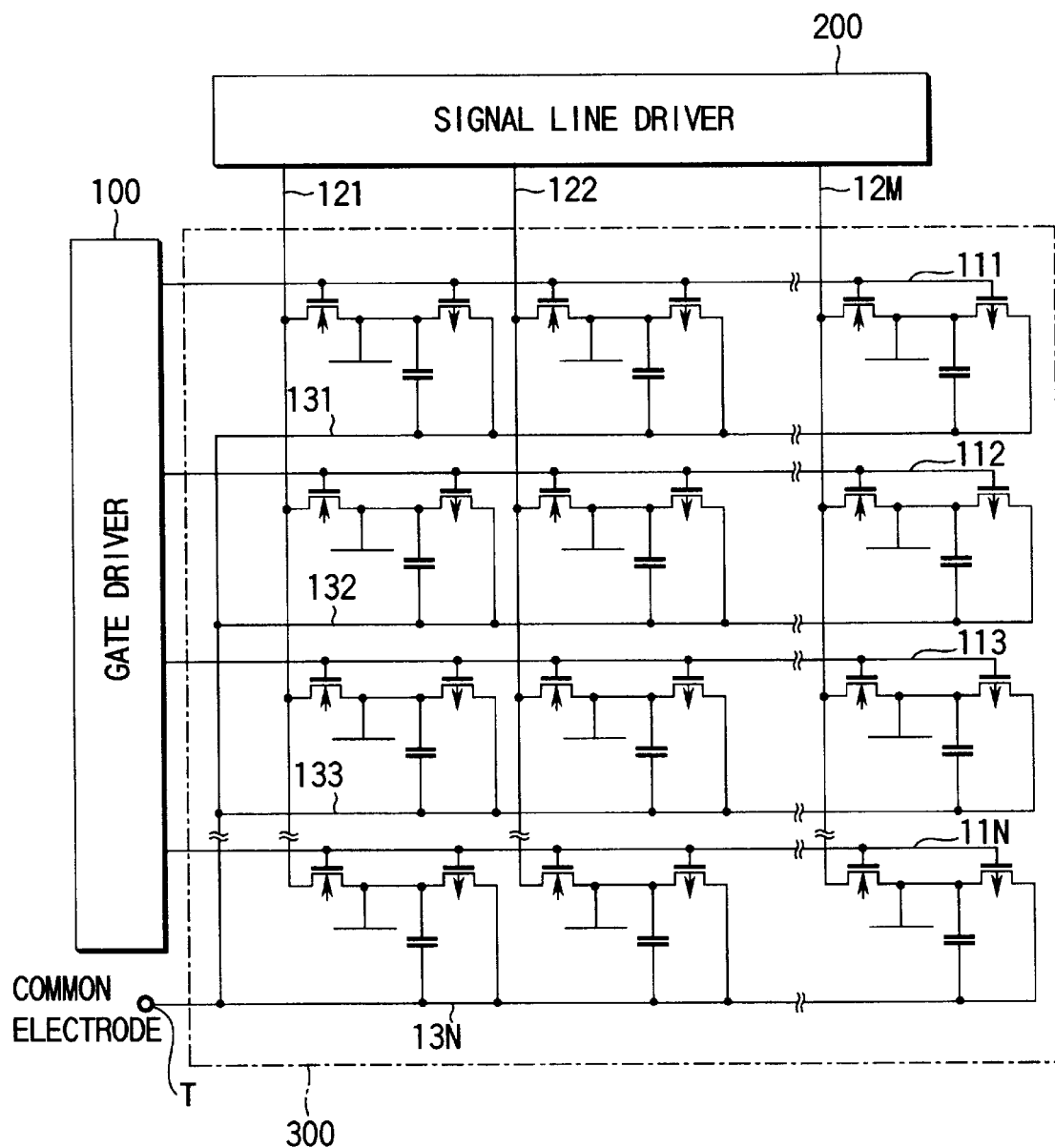
FIG. 10A is a circuit diagram for showing a wiring arrangement of the liquid crystal display device of the second embodiment.
Figure 10B:
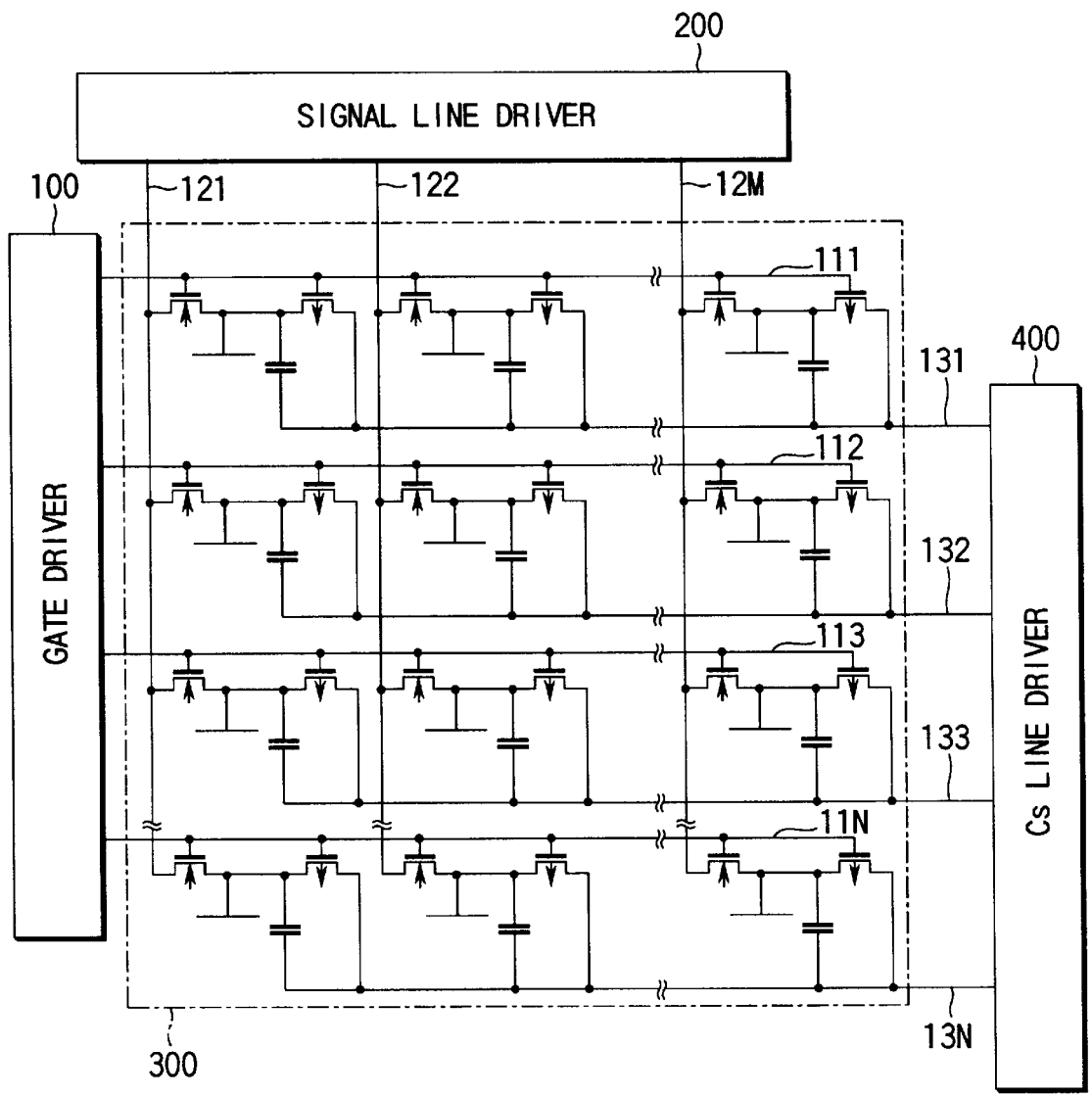
FIG. 10B is a circuit diagram for showing a wiring arrangement of the liquid crystal display device of the second embodiment.

The storage capacitance lines $13n-1$, $13n+1$, ... $13n+N$ of each row line are not connected to the remotest storage capacitance line $13n+N$ and taken out from the same terminal T to connect with the counter electrode outside the display region 300 as in the prior art shown in FIG. 10A, but is taken out from the terminal provided at the substrate end at the opposite side of the independent scanning line terminal in each line to the Cs line driver 400 outside the display region 300, and the potential of each storage capacitance line 13 can be driven independently by the Cs line driver 400.

Alternatively, the terminal of the storage capacitance line 13 and the terminal of the scanning line 11 may be taken out from the same side individually in the group of storage capacitance lines 13 and the group of scanning lines 11, and driven by individual groups of driving circuit IC.

The manufacturing method of TFT elements, liquid crystal materials and liquid crystal cells is same as in the first embodiment, and its explanation is omitted herein.

The driving system conformed to the VGA (upper and lower two-division drive) of maximum applied voltage of 3 V and selection time of one line of 64 μs. In each scanning line 11, a scanning line voltage waveform shown in FIGS. 9B to 9E was applied. The reset pulses $21n-1$, $21n$, $21n+1$ and $21n+2$ are partially overlapped in a plurality of pixel lines, and a sufficient reset time is maintained by setting the pulse width at about 300 μs. In this case, a pulse width at about 250 μs is also used and a sufficient reset time is also maintained.

Figure 11:
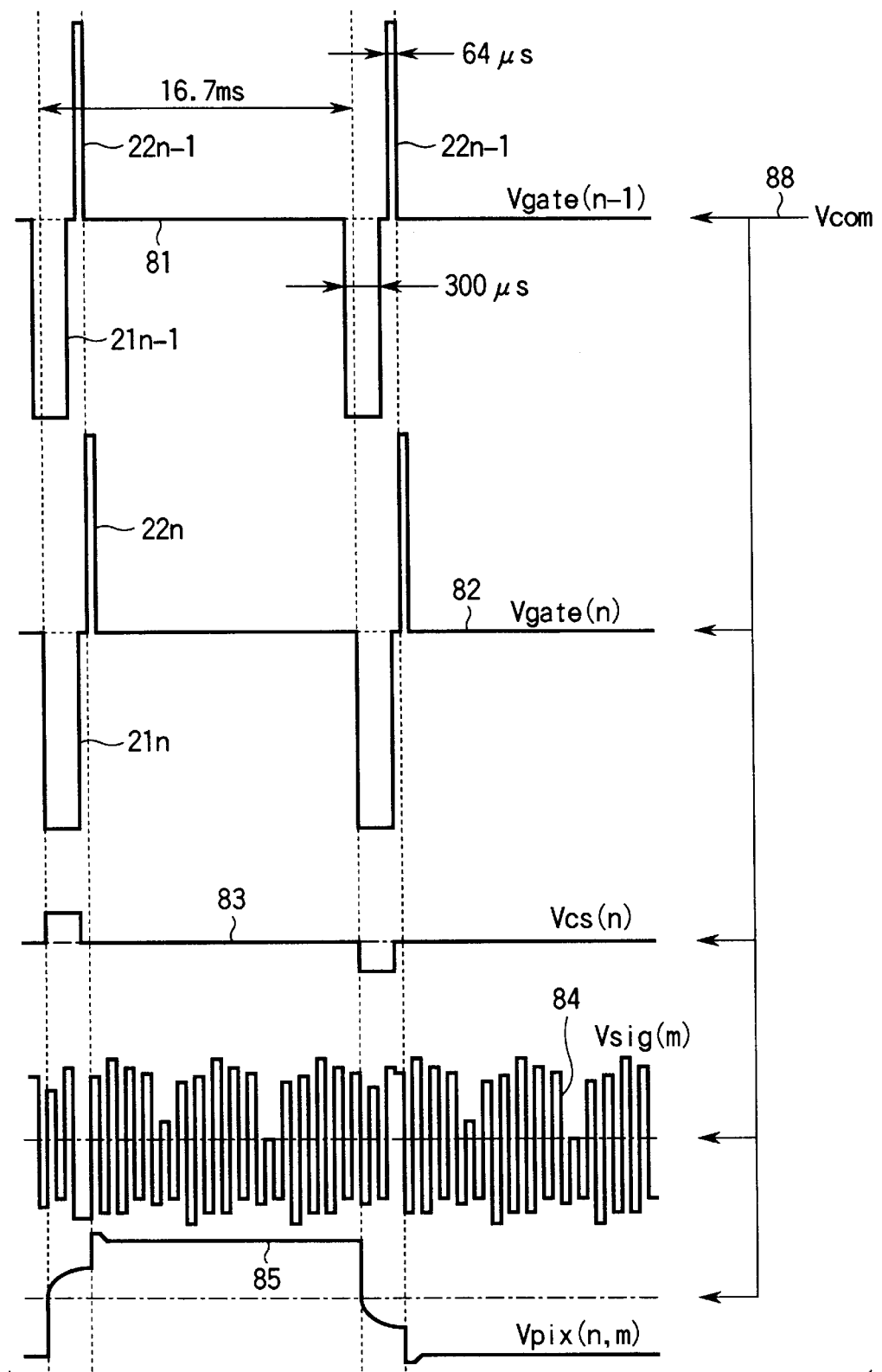
FIG. 11 shows signal waveforms for explaining the operation of the second embodiment device.

In FIG. 9A, when the reset pulse $21n$ shown in FIG. 11 is fed into the scanning line $11n$, the n-channel TFT element $14m,n$ is turned off, while the p-channel TFT element $17m,n$ is turned on. As the p-channel TFT element $17m,n$ is turned on, the pixel electrode $15m,n$ is connected to the storage capacitance line $13n$. Then, resetting is done by setting the potential Vpix(m,n) to a potential Vcsn of the storage capacitance line, thereby bringing the voltage Vpix(m,n) applied to the pixel electrode to near a voltage of ½ of the saturation voltage of reverse polarity of the signal polarity of the preceding frame and the reset operation is performed. This action is done by shifting the storage capacitance potential to a voltage of ½ of the saturation voltage of the liquid crystal.

In succession, by the signal writing pulse 22, the n-channel TFT element 14 is turned on, and the image is displayed as the image signal depending on the gradation of the image is fed from the signal line 12 into the pixel electrode 15.

The image signal 85 is an alternating current about the counter electrode potential Vcom, and the image is displayed by driving by inverting the line (H inversion) to invert the signal polarity in each line, in each frame.

As a result of image display, the contrast ratio was 70:1, and the response speed was 1 ms or less, and there was no afterimage due to step response.

[Third Embodiment]

The liquid crystal display element of the embodiment is a display forming 640×480 (VGA) pixels on an array substrate.

Figure 12:
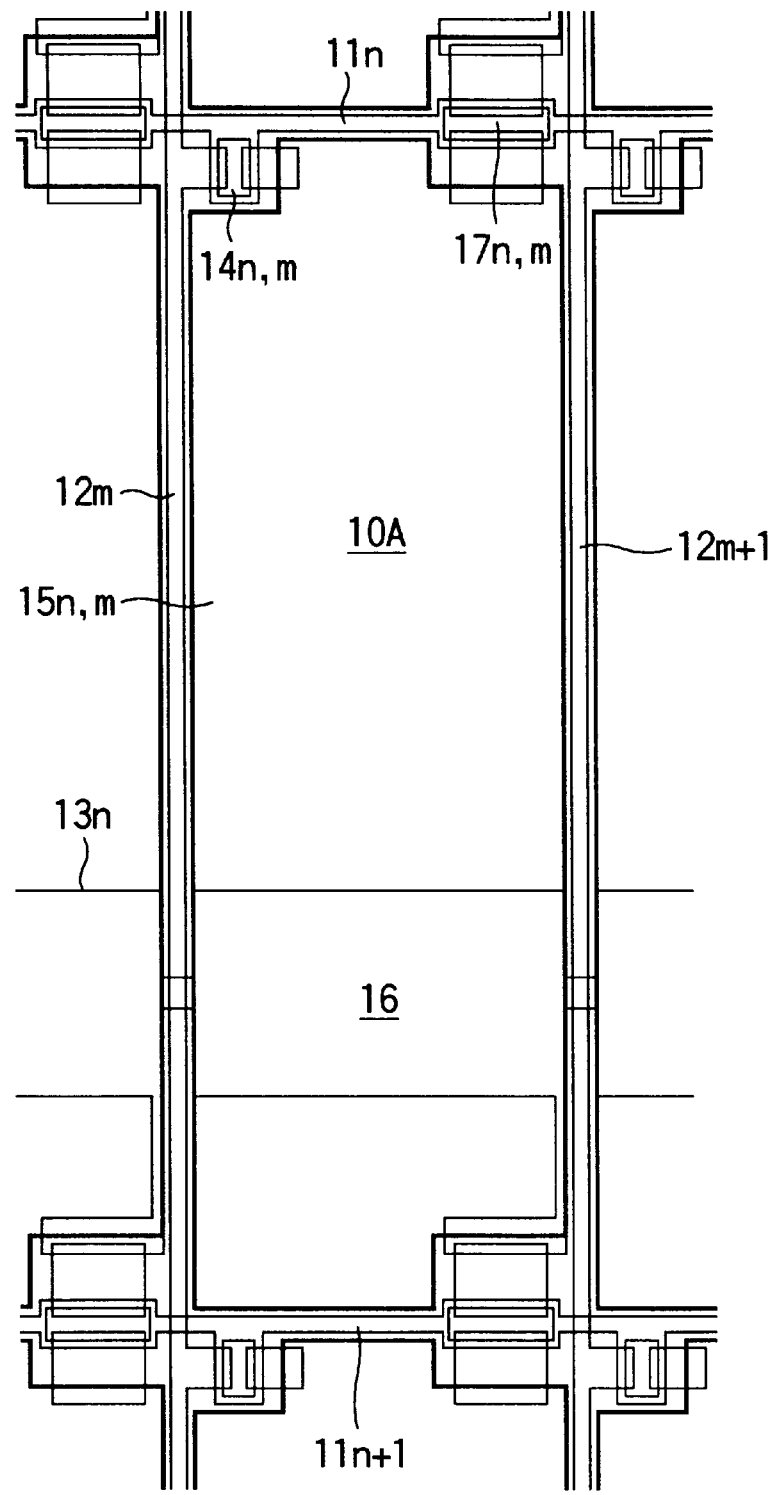
FIG. 12 is a plan view showing a pixel arrangement of an array substrate of a liquid crystal display device in a third embodiment.
Figure 13A:
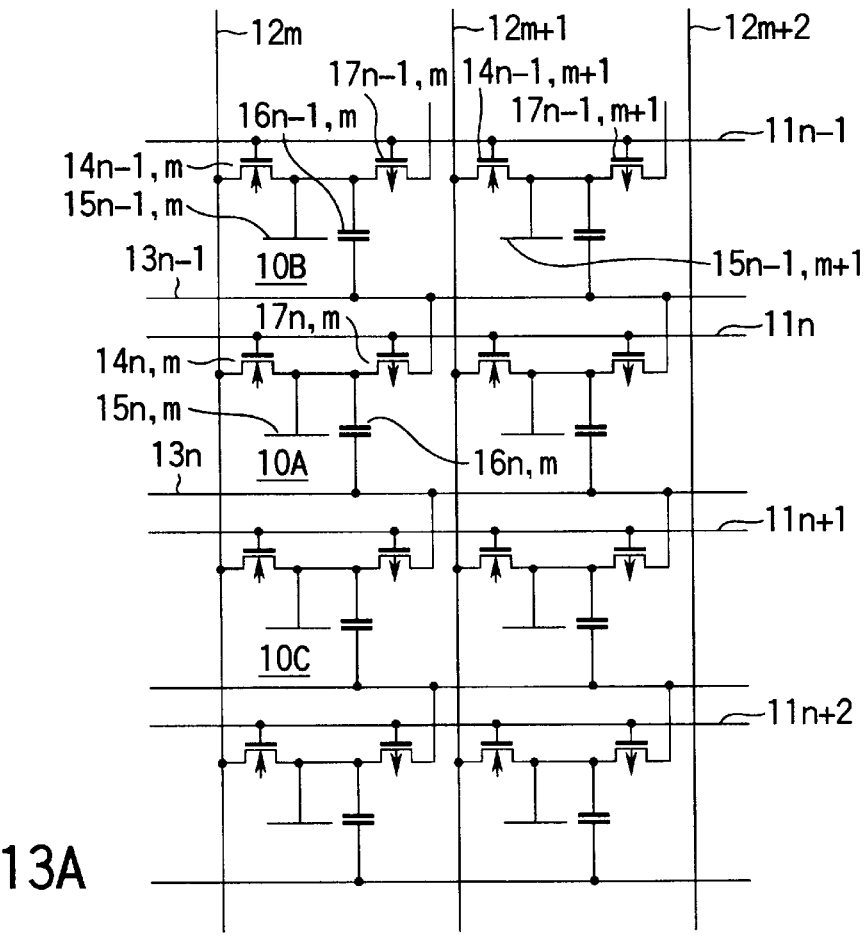
FIG. 13A is a diagram showing an equivalent circuit of the liquid crystal display device in the third embodiment.
Figure 13B:
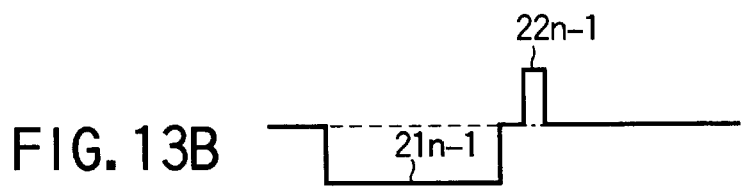
FIGS. 13B to 13E show diagrams of input waveforms applied to the scanning lines shown in FIG. 13A.
Figure 13C:
Figure 13D:
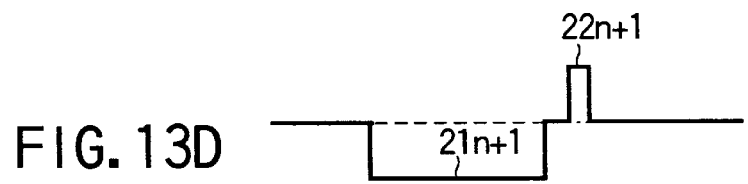
Figure 13E:

FIG. 12 is a plan view showing the composition of sub-pixel on the TFT array in the similar manner in the previous embodiments. FIG. 13A is a circuit diagram showing an equivalent circuit of four lines and two rows of sub-pixel group.

In FIG. 12 and FIG. 13A, same parts as in FIG. 1B and FIG. 2A are identified with same reference numerals, and their detailed description is omitted.

It is a feature of the embodiment that the gate electrodes of n-channel TFT element $14m,n$ and. p-channel TFT element $17m,n$ connected to the same pixel electrode $15m,n$ are connected to the scanning line of the same pixel line, and that the pixel electrode $15m,n$ is connected to the storage capacitance line $13n-1$ of a different pixel line (upper adjacent row) through the p-channel TFT element $17m,n$.

The manufacturing method of TFT elements is same as in the first embodiment, and its explanation is omitted herein.

The liquid crystal display element of the embodiment was a distorted helical ferroelectric liquid crystal (DHF liquid crystal) B of spontaneous polarization of 100 $nC/cm^2$, response time of 90 μs, and saturation voltage of 3 V. The liquid crystal cell is composed of TFT array substrate and CF substrate as manufactured by a conventional method. In the CF substrate, ITO electrode (counter electrode) was formed on the entire surface, and an $SiO_2$ film was formed on the ITO electrode in a thickness of 80 nm by sputtering method. On the ITO electrode layer of the TFT array substrate and the $SiO_2$ layer of the CF substrate, polyimide films of low pre-tilting performance were formed as orientation films of liquid crystal. The rubbing treatment and cell gap condition were same as in the first embodiment. The resultant product according to the present embodiment has a sectional view similar to that shown in FIG. 2F and the drawing showing the sectional structure of the present embodiment is omitted here.

The driving system conformed to the VGA (upper and lower two-division drive) of maximum applied voltage of ±3 V and selection time of one line of 64 μs. In each scanning line 11$n$−1, 11$n$, 11$n$+1 and 11$n$+2, scanning line driving voltage waveforms shown in FIG. 13B to 13E were applied. The reset pulses 21$n$−1, 21$n$, 21$n$+1 and 21$n$+2 are partially overlapped in a plurality of lines, and a sufficient reset time is maintained by setting the pulse width at about 200 μs.

For example, when the reset pulse 21$n$ is fed into the scanning line 11$n$, the n-channel TFT element 14$m,n$ is turned off, while the p-channel TFT element 17$m,n$ is turned on. As the p-channel TFT element 17$m,n$ is turned on, the pixel electrode 15$m,n$ is connected to the storage capacitance line 13$m$−1. Then, resetting is done by setting the voltage applied to the storage capacitance line 13$m$−1 and setting the pixel potential to a voltage near 0 V. This action is done by fixing the storage capacitance line potential at the same potential as the counter electrode potential.

In succession, by the signal writing pulse 22$n$, the n-channel TFT element 14$m,n$ is turned on, and the image is displayed as the image signal depending on the gradation of the image is fed from the signal line 12$m$ into the pixel electrode 15$n,m$.

The image signal is an alternating current about the counter electrode potential in the same manner as in the previous embodiments, and the image is displayed by driving by inverting the signal line to invert the signal polarity in each signal line, in each frame.

The contrast ratio was 70:1, and the response speed was 1 ms or less, and there was no afterimage due to step response.

[Fourth Embodiment]

Figure 14:
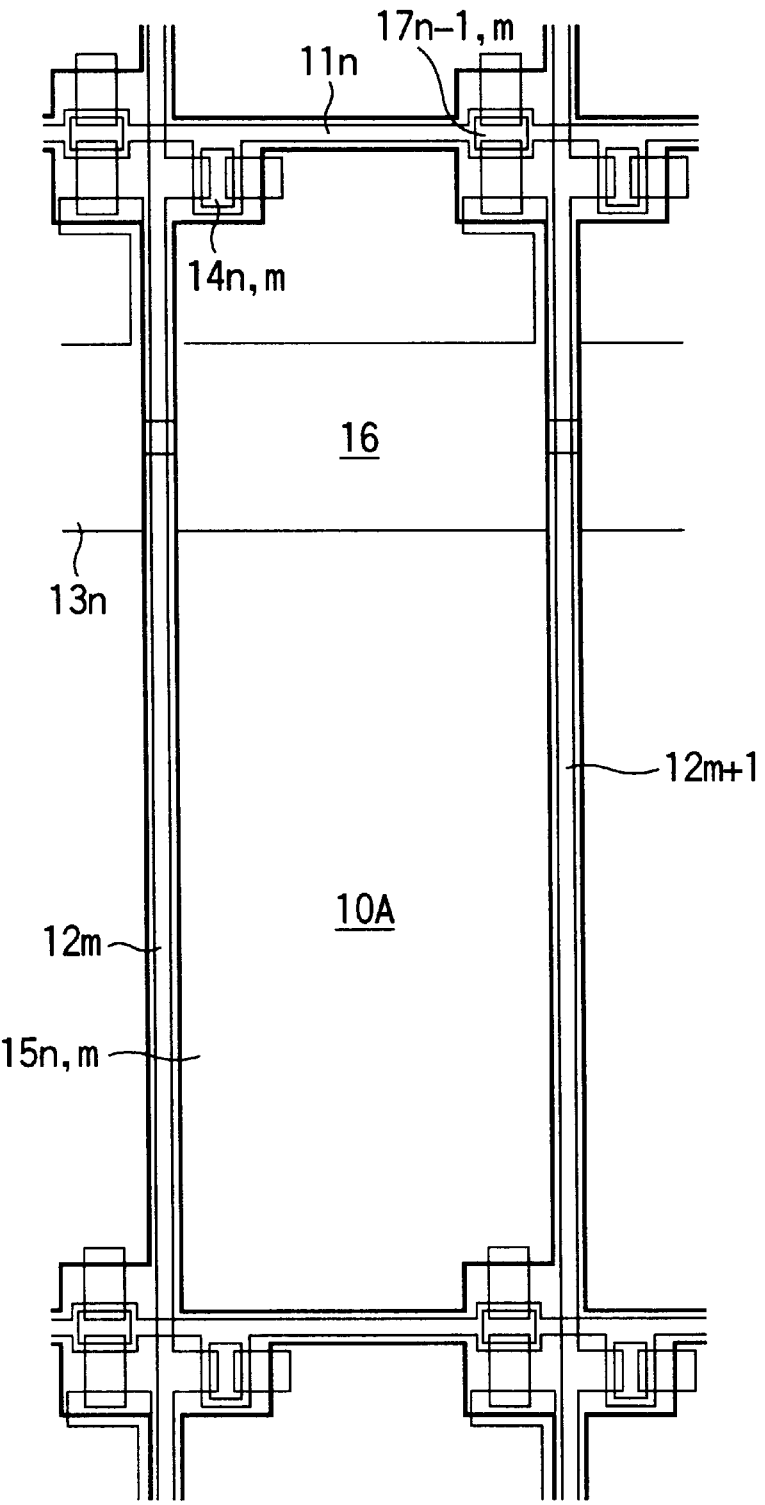
FIG. 14 is a plan view showing a pixel arrangement of an array substrate in a liquid crystal display device in a fourth embodiment.
Figure 15A:
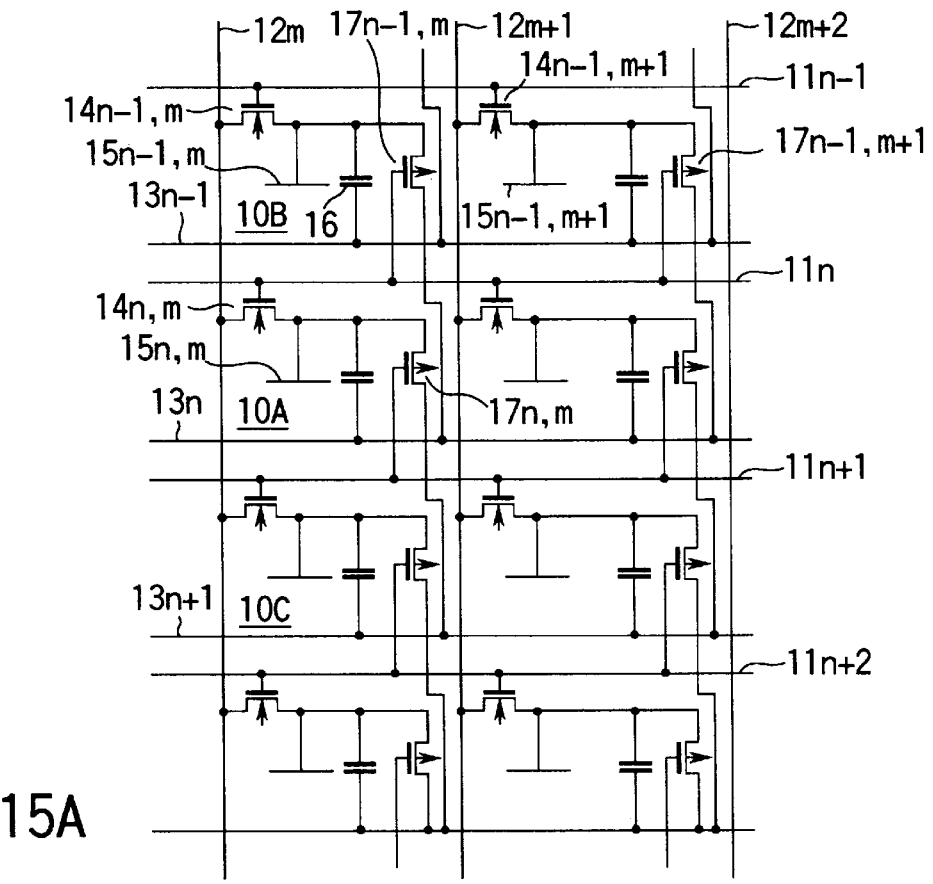
FIG. 15A is a diagram showing an equivalent circuit of the liquid crystal display device in the fourth embodiment.
Figure 15B:
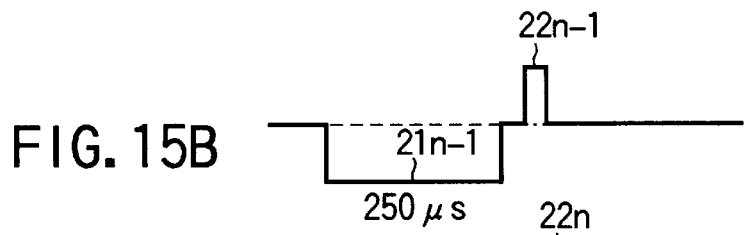
FIGS. 15B to 15E show diagrams of input waveforms applied to the scanning lines shown in FIG. 15A.
Figure 15C:
Figure 15D:
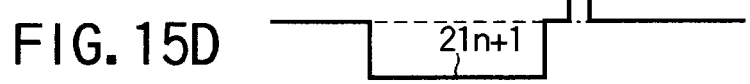
Figure 15E:
Figure 16:
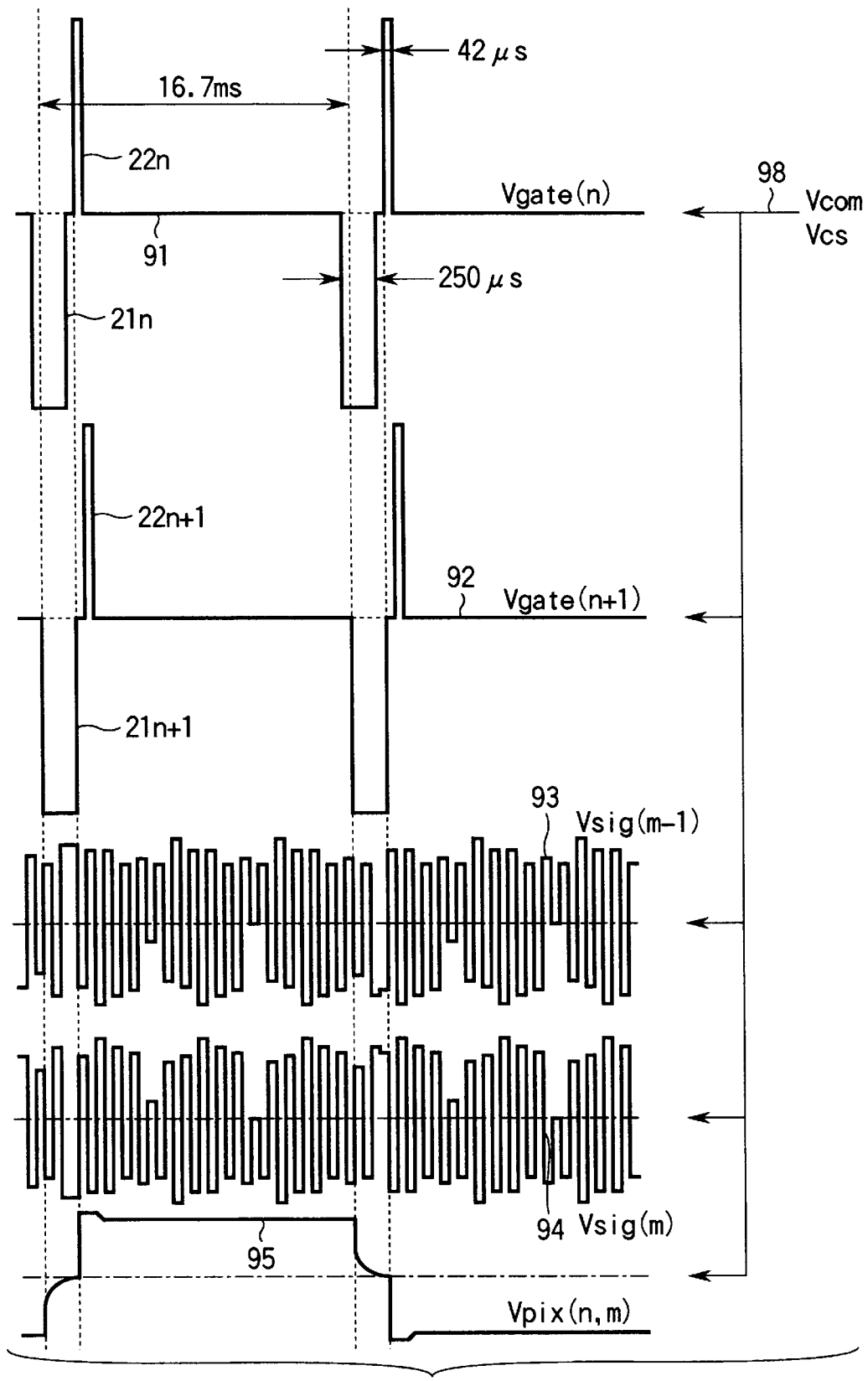
FIG. 16 shows signal waveforms for explaining the operation of the fourth embodiment device.

FIG. 14 is a plan view showing the composition of sub-pixel on the TFT array. FIG. 15A is a circuit diagram showing an equivalent circuit of four lines and two rows of sub-pixel group.

It is a feature of the embodiment that the gate electrodes of n-channel TFT element 14$n,m$ and p-channel TFT element 17$m,n$ connected to the same pixel electrode 15$n,m$ are connected to the different scanning lines 11$n$ and 11$n$+1 of different pixel rows, and that the pixel electrode 15$n,m$ is connected to the storage capacitance line 13$n$+1 of the different pixel row (lower adjacent line) through the p-channel TFT element 17$n,m$.

In the present embodiment, as the semiconductor layer of each TFT element, instead of a-Si used in the foregoing embodiments, poly-Si was used. The n-channel TFT element 14 and p-channel TFT element 17 were fabricated so that the difference of the threshold voltages of the two TFTs would be more than two times the signal amplitude in driving by adjusting the initial carrier concentration and film thickness of the poly-Si layer and thickness of gate insulating film. As described below, in the driving system of the embodiment, since the signal amplitude is ±3 V, the difference of the threshold voltages was set at 6 V or more. The manufacturing method of the liquid crystal material and cell is same as in the first embodiment.

The driving system conformed to the XGA (upper and lower two-division drive) of maximum applied voltage of ±3 V and selection time of one line of 42 μs. In each scanning line 11$n$−1, 11$n$, 11$n$+1 and 11$n$+2, scanning line driving voltage waveform shown in FIGS. 15B to 15E were applied.

The reset pulses 21$n$−1, 21$n$, 21$n$+1 and 21$n$+2 are partially overlapped in a plurality of lines, and a sufficient reset time is maintained by setting the pulse width at about 250 μs.

When the reset pulse 21$n$ is fed into the scanning line 11$n$, the n-channel TFT element 14$n,m$ remains in off state, while the p-channel TFT element 17$n$−1,$m$ connected to the pixel electrode 15$n$−1,$m$ one line above is turned on. As the p-channel TFT element 17$n$−1,$m$ is turned on, the pixel electrode 15$n$−1,$m$ is connected to the storage capacitance line 13$n$.

By hardly moving the storage capacitance potential, when the p-channel TFT element 17$n$−1,$m$ is turned on, the potential Vcs is set equal to the counter electrode potential Vcom, and resetting is done by setting the voltage applied to the pixel to a voltage near 0 V.

In succession, by the signal writing pulse 22$n$, the n-channel TFT element 14$n,m$ is turned on, and the p-channel TFT element 17$n$−1,$m$ is turned off, and the image signal depending on the gradation of the image is fed from the signal line 12$m$ into the pixel electrode 15$n,m$.

The image signal is an alternating current about the counter electrode potential Vcom, and the image is displayed by driving by inverting the pixel (dot inversion) to invert the signal polarity in each pixel (row and column), in each frame.

As a result of image display, the contrast ratio was 70:1, and the response speed was 1 ms or less, and there was no afterimage due to step response.

COMPARATIVE EXAMPLES

A cell was manufactured in the same condition as in the first embodiment except that the array structure was a conventional type having one TFT element and one scanning line and signal line per pixel. By ordinary driving without resetting action, the contrast ratio was lowered to 20:1, and after-image due to step response was recognized. Next, it was attempted to drive by resetting in the first half of the selection time of one line. Although the after-image due to step response was eliminated, the contrast ratio was only about 25:1.

As other embodiment, a cell was manufactured in the same condition by using the same array structure, cell composition, and circuit configuration as in the first embodiment, except for using p-channel TFT element as signal writing TFT element, using n-channel TFT element as resetting TFT element, and setting W/L of the p-channel TFT element larger than that of n-channel TFT element.

In this case, by the same driving as in the first embodiment, afterimage due to step response was eliminated, and the contrast ratio was 50:1.

It was hence known preferable to use the n-channel TFT element as the signal writing TFT element, and use the p-channel TFT element as the resetting TFT element.

Next is explained an embodiment of liquid crystal display element having two TFT elements, a signal writing TFT element and resetting TFT element, in which the individual TFT elements are connected to different scanning lines.

[Fifth Embodiment]

The liquid crystal display element of the embodiment relates to a matrix layout of 1024×768 pixels (XGA).

Figure 17:
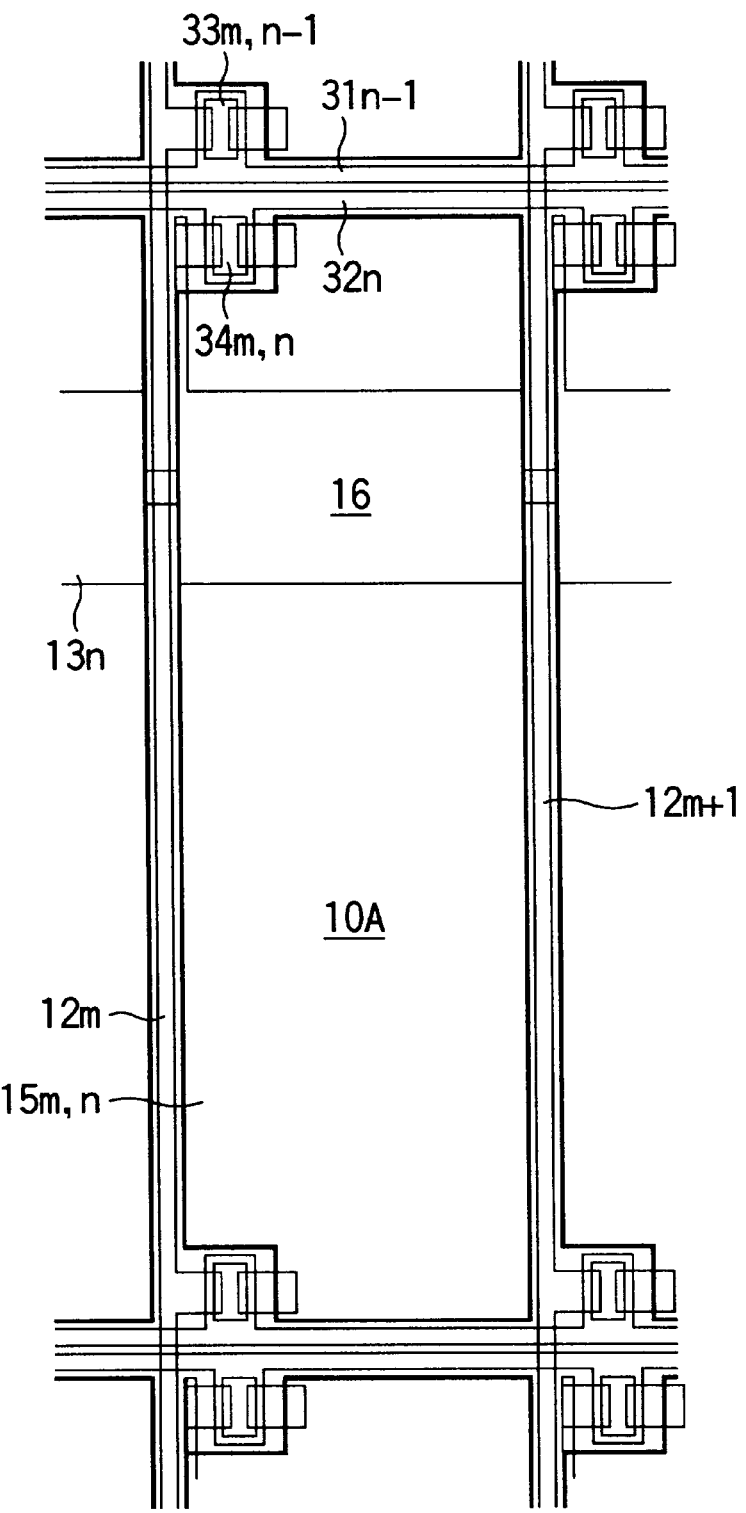
FIG. 17 is a plan view showing a pixel arrangement of an array substrate in a liquid crystal display device in a fifth embodiment.
Figure 18:
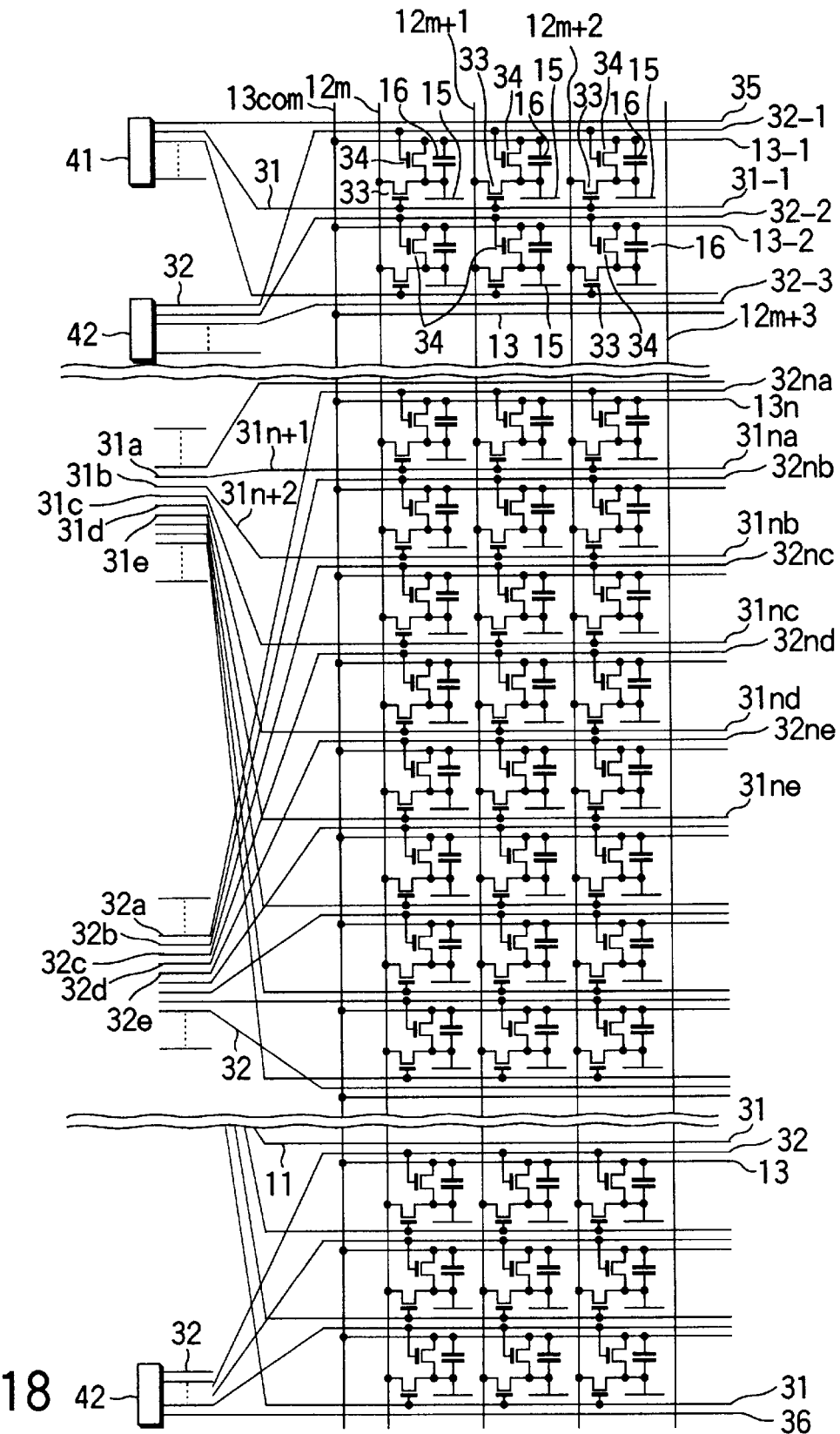
FIG. 18 is a diagram showing an equivalent circuit of the liquid crystal display device in the fifth embodiment.
Figure 21:
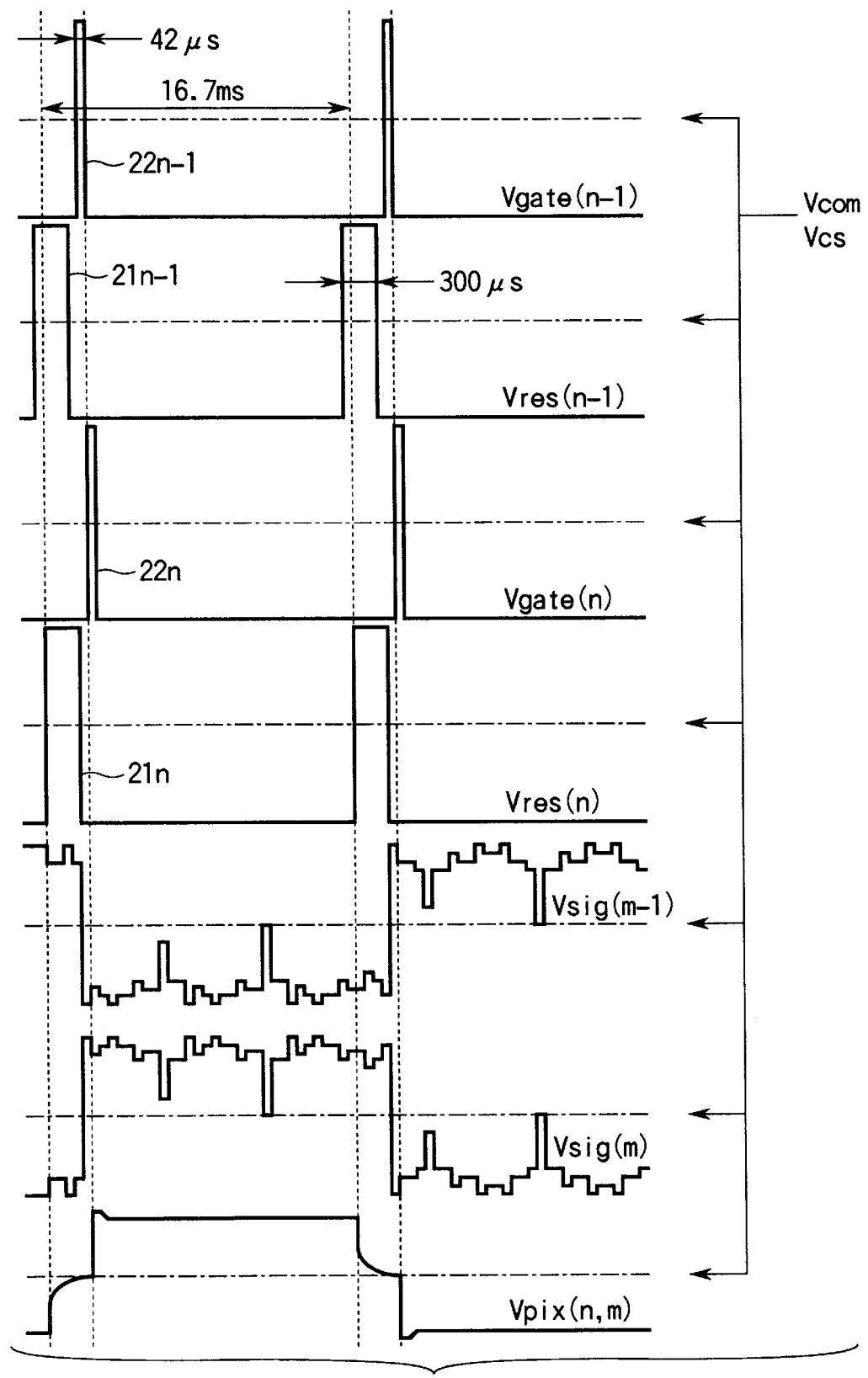
FIG. 21 shows signal waveforms for explaining the operation of the fifth embodiment device.

FIG. 17 is a plan view showing a constitution of a TFT array substrate of the liquid crystal display element of the fifth embodiment of the present invention. FIG. 18 is an equivalent circuit of the portion of three columns of sub-pixel group.

A first scanning line 31 and a second scanning line 32 are formed in the row direction, and signal lines 12$m$, 12$m$+1, 12m+2 are formed in the columns direction. A storage capacitance line 13-1, 13n, 13n+1, 13n+2 are formed in the row direction, and are connected to a common storage capacitance line 13com at the end.

The first scanning line 31-1 is connected to the gate electrode of a signal writing TFT element 33. The signal lines 12m, 12m+1 and 12m+2 are connected to a pixel electrode 15 through the signal writing TFT element 33.

The second scanning line 32-1 is connected to the gate electrode of a resetting TFT element 34. The storage capacitance line 13-1 is connected to the pixel electrode 15 through the resetting TFT element 34. The pixel electrode 15 is connected to the storage capacitance line 13 through a storage capacitance 16.

The first scanning lines 35, 31-1, 31-2 are bunched into three bundles from the TFT array substrate end, and connected to a first scanning line driving IC 41, and the second scanning lines 32-1, 32-2, 32-3 are also bunched into three bundles from the array substrate end, and connected to a second scanning line driving IC 42.

The signal writing and resetting TFT elements 33, 34 are fabricated by using a-Si layer in the channel.

The liquid crystal cell is composed by disposing the TFT array substrate forming TFT elements and pixel electrode, and the CF substrate forming the counter electrode oppositely to each other, and injecting liquid crystal material between the two. The CF substrate has an overcoat layer, the ITO electrode in the portion confronting the TFT element and the signal lines of the array substrate are removed by etching. Moreover, an $SiO_2$ film of 30 nm in thickness is formed on the ITO electrode layer.

On the ITO electrode of TFT substrate and $SiO_2$ layer of CF substrate, polyimide films of low pre-tilting performance were formed as alignment films of liquid crystal. The alignment film of each substrate was rubbed along the scanning line direction, reversely to the injection direction of liquid crystal material. However, the rubbing axis of both substrates was deviated by about 10° each. The cell gap was defined at 2.0 micrometers by scattering resin-coated silica spacer.

As the liquid crystal material, thresholdless anti-ferroelectric liquid crystal A (Mitsui Petrochemical Industries) of spontaneous polarization of 200 $nC/cm^2$, response time of 100 $\mu s$, and saturation voltage of 4 V was used.

The driving system conformed to the XGA (upper and lower two-division drive) of maximum applied voltage of ±5 V and selection time of one line of 42 $\mu s$. In each first scanning line 31na, 31nb, 31nc, 31nd, 31ne of the equivalent circuit shown in FIG. 18, a driving waveform shown in FIG. 19A to 19E was applied, and in each second scanning line 32na, 32nb, 32nc, 32nd, 32ne a driving waveform shown in FIG. 20A to FIG. 20E was applied. The reference numerals attached to the driving waveform in FIG. 19A to FIG. 20E correspond to the first and second scanning lines 31a–31e, 32a–32e provided with reference numerals in FIG. 18.

The driving waveform is composed of reset pulses 21n–1 to 21n+3 for turning on the resetting TFT element 34, and signal writing pulses 22n–1 to 22n+3 for turning on the signal writing TFT element 33. The reset pulses 21n–1 to 21n+3 are partially overlapped in a plurality of lines, and a sufficient reset time is maintained by setting the pulse width at about 300 $\mu s$.

When the reset pulse 21n–1 is fed into the second scanning line 32a, the signal writing TFT element 33 remains in off state, while the resetting TFT element 34 is turned on. As the resetting TFT element 34 is turned on, the pixel electrode 15 is connected to the storage capacitance line 13 as in the previous embodiments. The potential of the storage capacitance line 13 is fixed to the counter electrode potential, and resetting is done by setting the voltage applied to the pixel to a voltage near 0 V.

In succession, by the signal writing pulse 22 n-entered in the first scanning line 31a, the signal writing TFT element 33 is turned on, and the image is displayed as the image signal depending on the gradation of the image is fed from the signal line 12 into the pixel electrode 15.

The image signal is an alternating current about the counter electrode potential, and the image is displayed by driving by inverting the signal line to invert the signal polarity in each column, in each frame. The potential of the storage capacitance line was constant, same as the counter electrode potential.

As a result of image display, the contrast ratio was 70:1, and the response speed was 1 ms or less, and there was no after-image due to step response.

According to the liquid crystal display device of the embodiment, in order that the first scanning line and second scanning line be driven by different ICs, terminals of the first scanning line and second scanning line are separated at the same side of the array substrate and two system are provided, and it is possible to drive by the conventional scanning line driving ICs, so that increase of cost can be suppressed. That is, since the first and second scanning lines are alternately disposed in the display region, if the terminals for connecting the driving ICs are provided at the same side of the substrate end, the number of terminals increases, the number of driving ICs increases, and the scanning line driving ICs different from the conventional specification are required, which leads to increase of cost.

The same effects are obtained if the two terminals are installed at different sides on the array substrate, if the terminals are separated into two systems by a peripheral circuit.

[Sixth Embodiment]

The liquid crystal display element of the embodiment relates to a matrix layout of 640×480 pixels (VGA).

Figure 22:
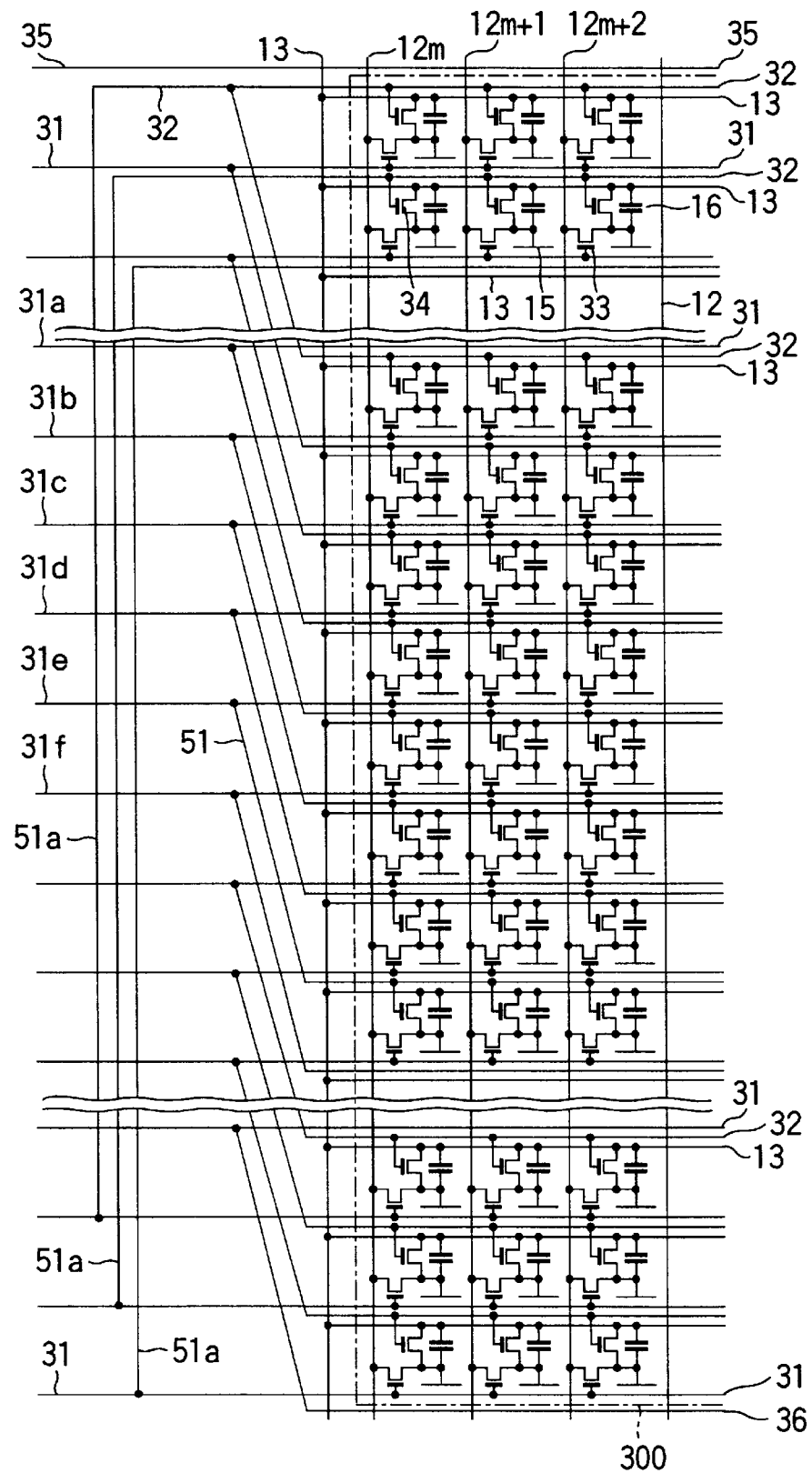
FIG. 22 is a diagram showing an equivalent circuit of a liquid crystal display device in a sixth embodiment.

FIG. 22 is a circuit diagram showing an equivalent circuit of the liquid crystal display element of the sixth embodiment of the present invention. In FIG. 22, same parts as in FIG. 18 are identified with same reference numerals, and their explanation is omitted. The composition of sub-pixel group is same as in the fifth embodiment, and its illustration is omitted.

It is a feature of the embodiment that a second scanning line 32 is connected to a first scanning line 31 three pixel lines apart through a bypass line 51 out of the image region.

At the TFT array substrate end, a terminal common to the first and second scanning lines 31, 32 is provided. That is, scanning line terminals are provided as many as the pixel lines, and it is same as in the conventional liquid crystal display element consisting of one system of scanning lines.

Figure 23:
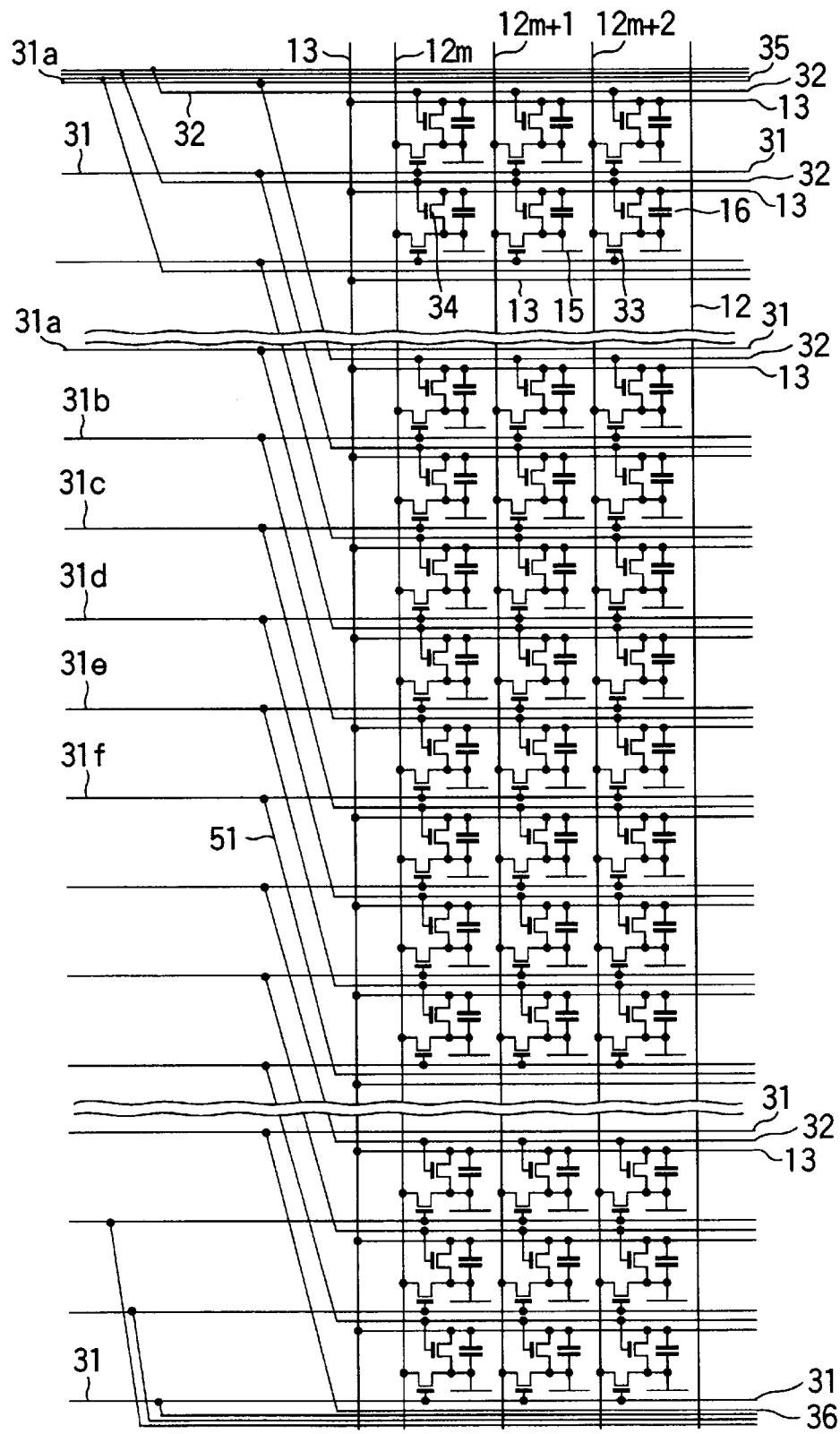
FIG. 23 is a diagram showing an equivalent circuit of the liquid crystal display device in the sixth embodiment.
Figures 24A, 24B, 24C, 24D, 24E, 24F:
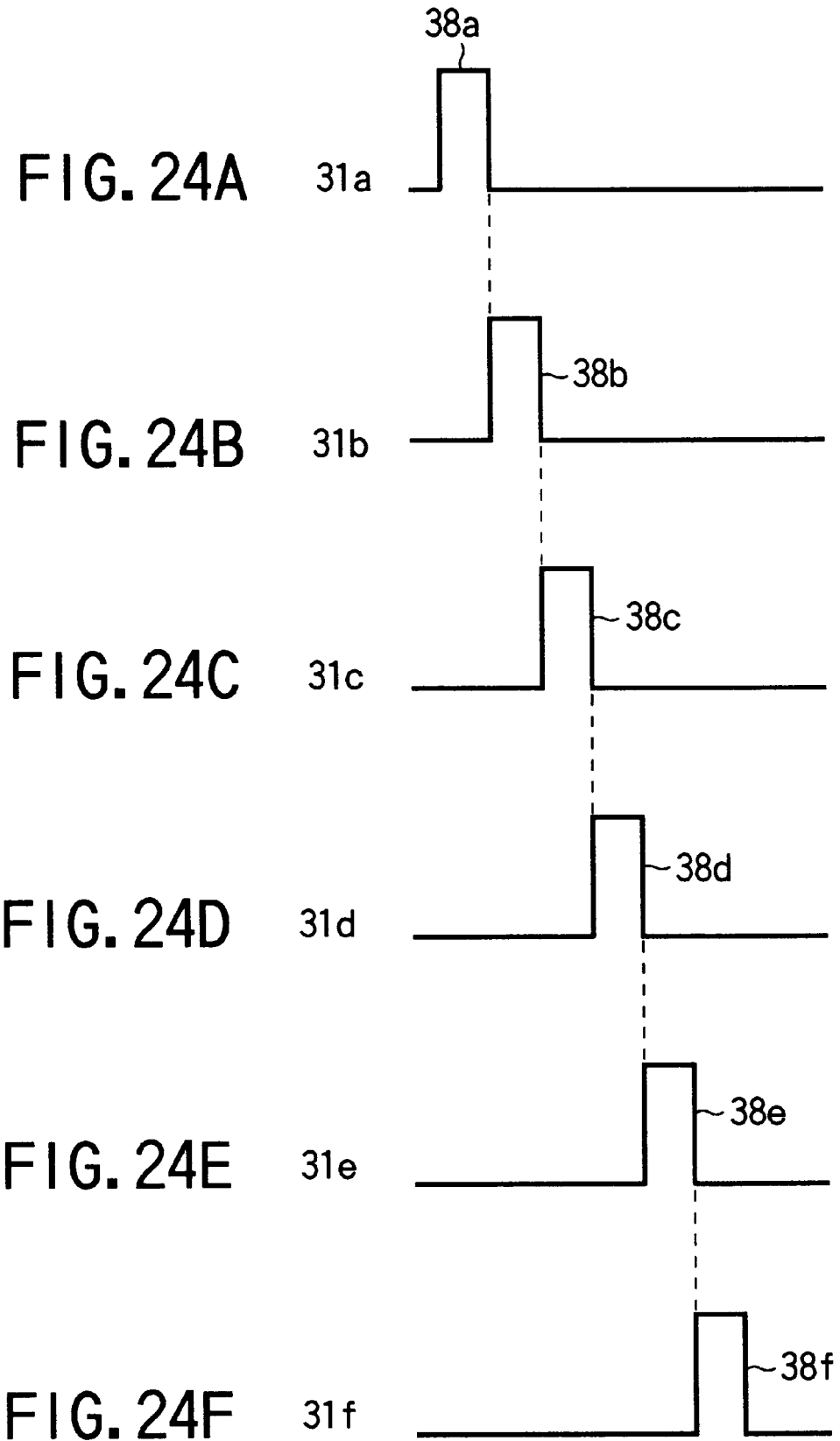
FIGS. 24A to 24F are diagrams showing input waveforms into the liquid crystal display device in the sixth embodiment.
Figure 25:
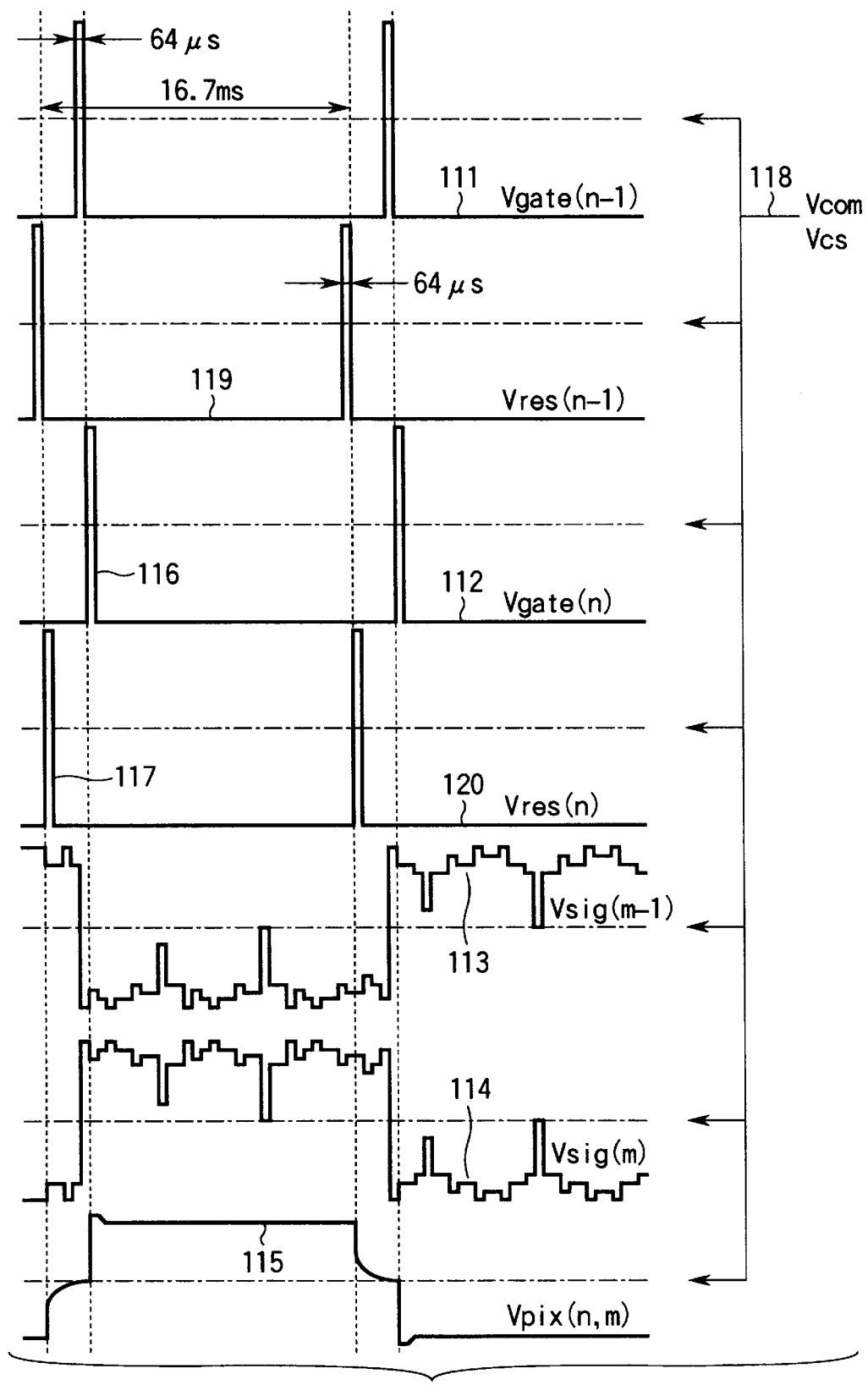
FIG. 25 shows signal waveforms for explaining the operation of the sixth embodiment device.

In the image-free regions in the highest portion and lowest portion, first and second dummy scanning lines 35, 36 are provided so that the writing property may be same as in the center. The first scanning line 31 in the lowest portion and the second scanning line 32 in the highest portion are connected through a bypass line 51a. Alternatively, as shown in FIG. 23, without connecting the first scanning line 31 in the lowest portion and the second scanning line 32 in the highest portion, the second scanning line 32 in the highest layer and the first scanning line 31 in the lowest layer may be respectively connected to the first and second dummy scanning lines 35, 36.

In other method, for example, terminals at the array substrate end may be provided separately for the. first scanning line 31 and second scanning line 32, and the bypass line 51 may be provided on a peripheral circuit board to be connected to the driving IC, and the same effects as in the example above are obtained in the display properties.

Further, in the case of upper and lower two-division drive separated with the signal line 12 in the middle, by connecting the terminals of the scanning lines corresponding to the same position in the upper and lower parts on the array substrate or peripheral circuit, the number of scanning line driving ICs may be reduced to half.

The manufacturing method of TFT elements and liquid crystal cell is same as in the fifth embodiment. As the liquid crystal material, thresholdless anti-ferroelectric liquid crystal C of spontaneous polarization of 140 $nC/cm^2$, response time of 120 $\mu$s, and saturation voltage of 6 V was used. After forming the cell, the scanning line group was connected from the array substrate end to the scanning line driving IC through the peripheral circuit board.

The scanning line driving IC conformed to the VGA (upper and lower two-division drive) of maximum applied voltage of ±5 V and selection time of one line of 64 $\mu$s.

In each scanning line terminal 31a–31f, driving waveform signals shown in FIG. 24A to FIG. 24F were applied, and reset action and write action were conducted. A pulse 38 in this waveform is a pulse for turning on the signal writing TFT element 33 connected to the first scanning line 31, and a pulse for turning on the resetting TFT element 34 connected to the second scanning line 32 three pixel lines apart.

The pulse 38 entered in the second scanning line 32 is same as the writing pulse of the first scanning line 31 of the pixel three pixel lines apart, and its reset time is about 64 $\mu$s.

The potential Vcs of the storage capacitance line 13 is fixed to the counter electrode potential Vcom, and resetting is done by setting the voltage Vpix(m,n) applied to the pixel to a voltage near 0 V. For an interval of about 192 $\mu$s between the reset action and write action, the liquid crystal continues to respond, thereby resetting almost completely.

The image signal Vsig 113, 114 entered from the signal line is an alternating current about the counter electrode potential Vcom, and the image is displayed by driving by inverting the signal line to invert the signal polarity in each column, in each frame.

As a result of image display, the contrast ratio was 80:1, and the response speed was 1 ms or less, and there was no after-image due to step response.

Figure 26:
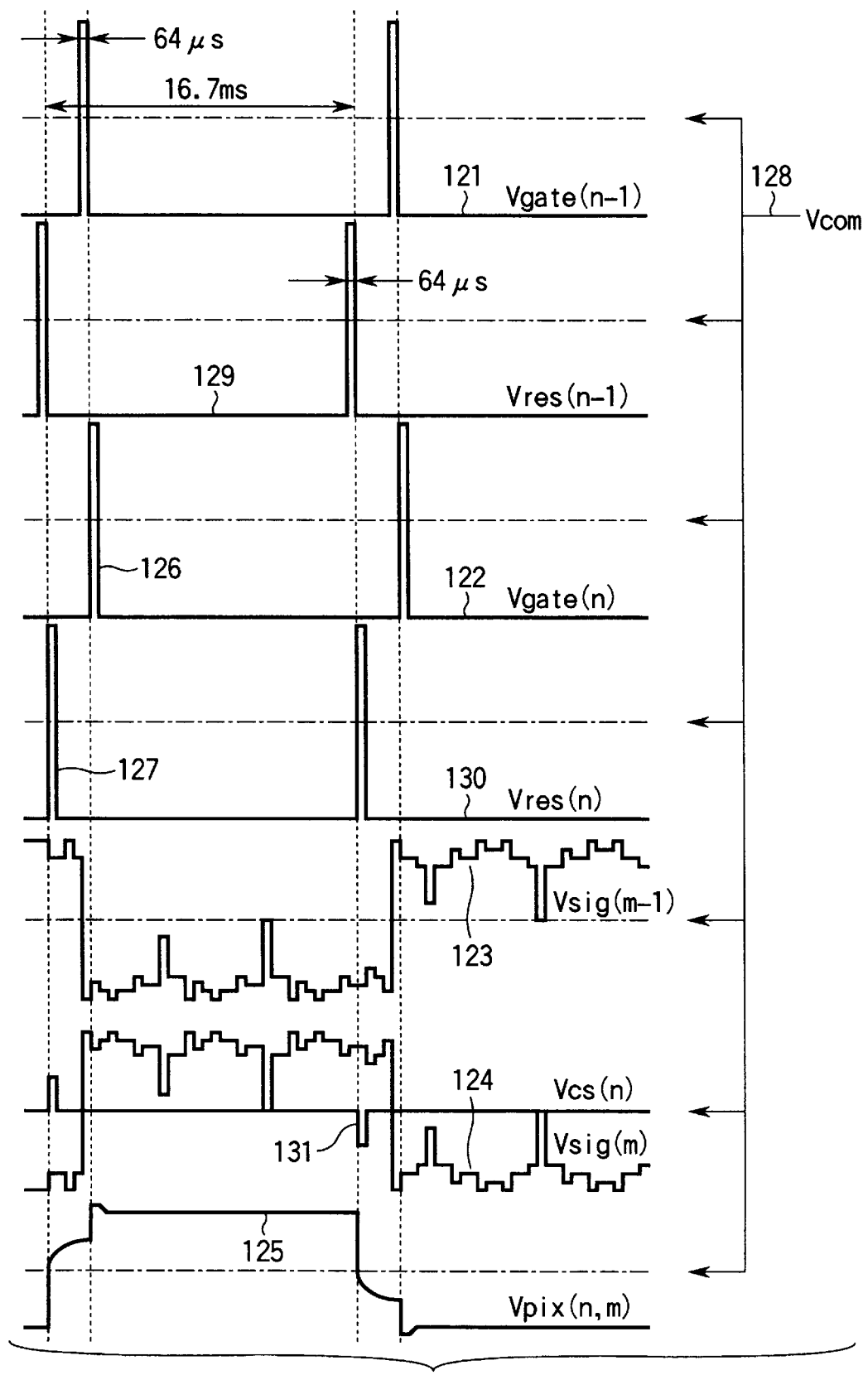
FIG. 26 shows signal waveforms for explaining the operation of a modified sixth embodiment device.

Besides, a different array structure was composed, in which storage capacitance lines of individual lines are not completely connected on the substrate but are independent and, being taken out from other terminals, the individual storage capacitance lines 13 are driven independently. In the same condition except for the above structure, same driving was attempted. However, reset action was done by setting the voltage applied to the pixel to ½ voltage of the saturation voltage of the liquid crystal of reverse polarity of the signal polarity of the preceding frame. In this reset action, the potential Vcs 131 (FIG. 26) of the storage capacitance line was shifted to ½ voltage of the saturation voltage of the liquid crystal.

The image signal 123, 124 is an alternating current about the counter electrode potential, and the image is displayed by driving by inverting the signal line to invert the signal polarity in each column, in each frame.

As a result of image display, the contrast ratio was 80:1, and the response speed was 1 ms or less, and there was no after-image due to step response.

According to the embodiment, by connecting the second scanning line to the first scanning line of different pixel line, it is possible to reset by using the conventional driving IC, so that increase of cost can be suppressed.

[Seventh Embodiment]

The liquid crystal display element of the embodiment relates to a matrix layout of 640×480 pixels (VGA).

Figure 27:
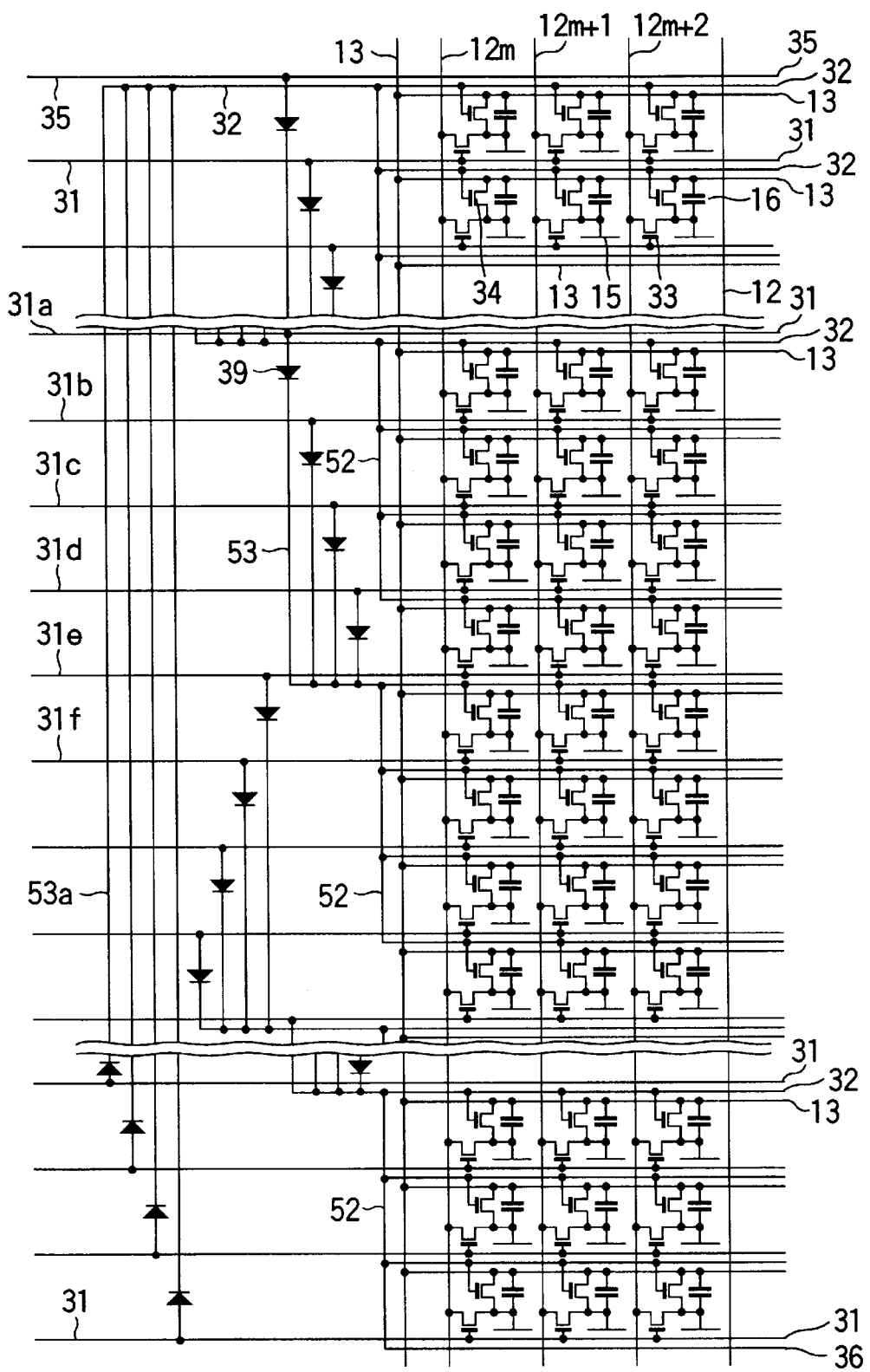
FIG. 27 is a diagram showing an equivalent circuit of a liquid crystal display device in a seventh embodiment.

FIG. 27 is a circuit diagram showing an equivalent circuit of the liquid crystal display element of the seventh embodiment of the present invention. In FIG. 27, same parts as in FIG. 22 are identified with same reference numerals, and their explanation is omitted. The composition of sub-pixel group is same as in the fifth embodiment, and its illustration is omitted.

It is a feature of the embodiment that four second scanning lines 32 are connected to a bypass line 52 out of the image region, and that the bypass line 52 is further connected to four bypass lines 53 through diodes 39 individually. The four bypass lines 53 connected to the same bypass line 52 are connected to the first scanning line 31 in which signal writing pulses are applied continuously.

At the TFT array substrate end, a terminal common to the first and second scanning lines 31, 32 is provided. That is, scanning line terminals are provided as many as the pixel lines, and it is same as in the conventional liquid crystal display element consisting of one system of scanning lines.

In other method, for example, terminals at the array substrate end may be provided separately for the first scanning line 31 and second scanning line 32, and the bypass line 52 with the diode 39 may be provided on a peripheral circuit board to be connected to the driving IC, and the same effects as in the example above are obtained in the display properties.

Figure 28:
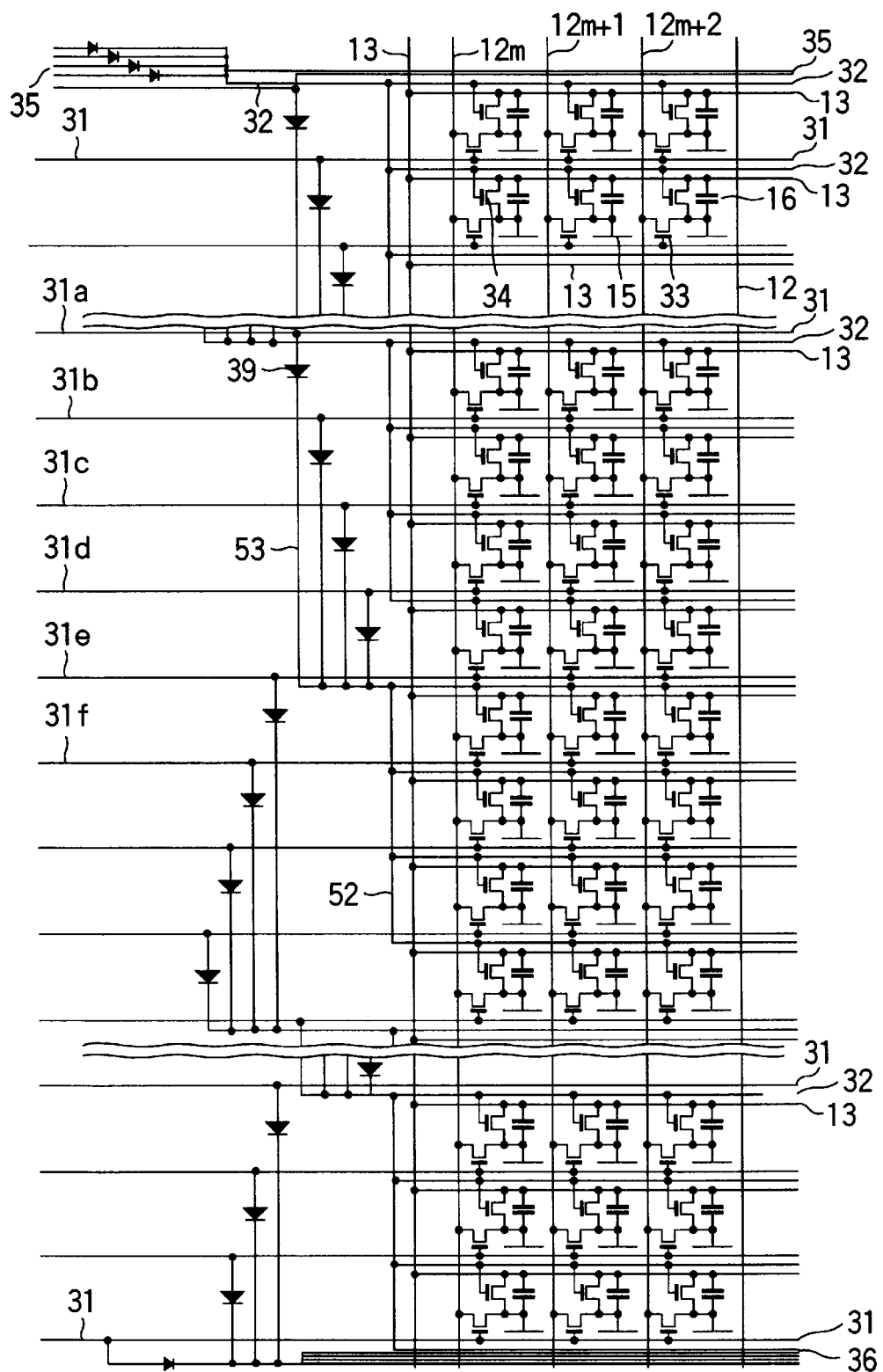
FIG. 28 is a diagram showing an equivalent circuit of a modified liquid crystal display device in the seventh embodiment.
Figure 29A:
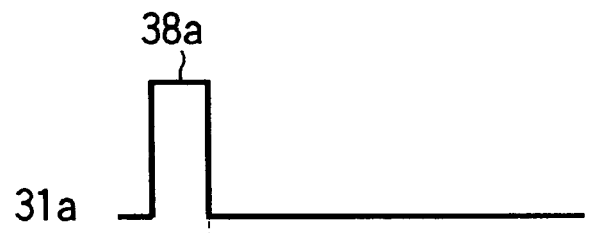
FIGS. 29A to 29F are diagrams showing input waveforms supplied into the liquid crystal display device in the seventh embodiment.
Figure 29B:
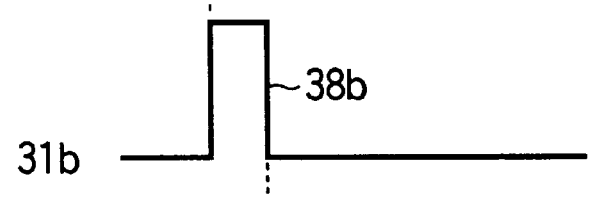
Figure 29C:
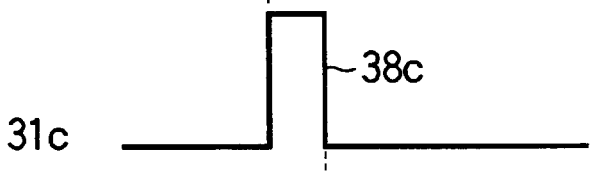
Figure 29D:
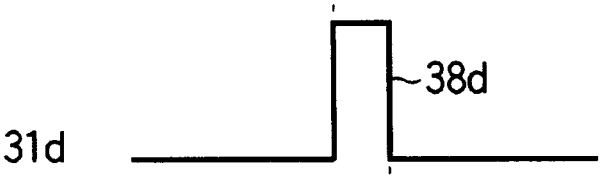
Figure 29E:
Figure 29F:
Figure 30:
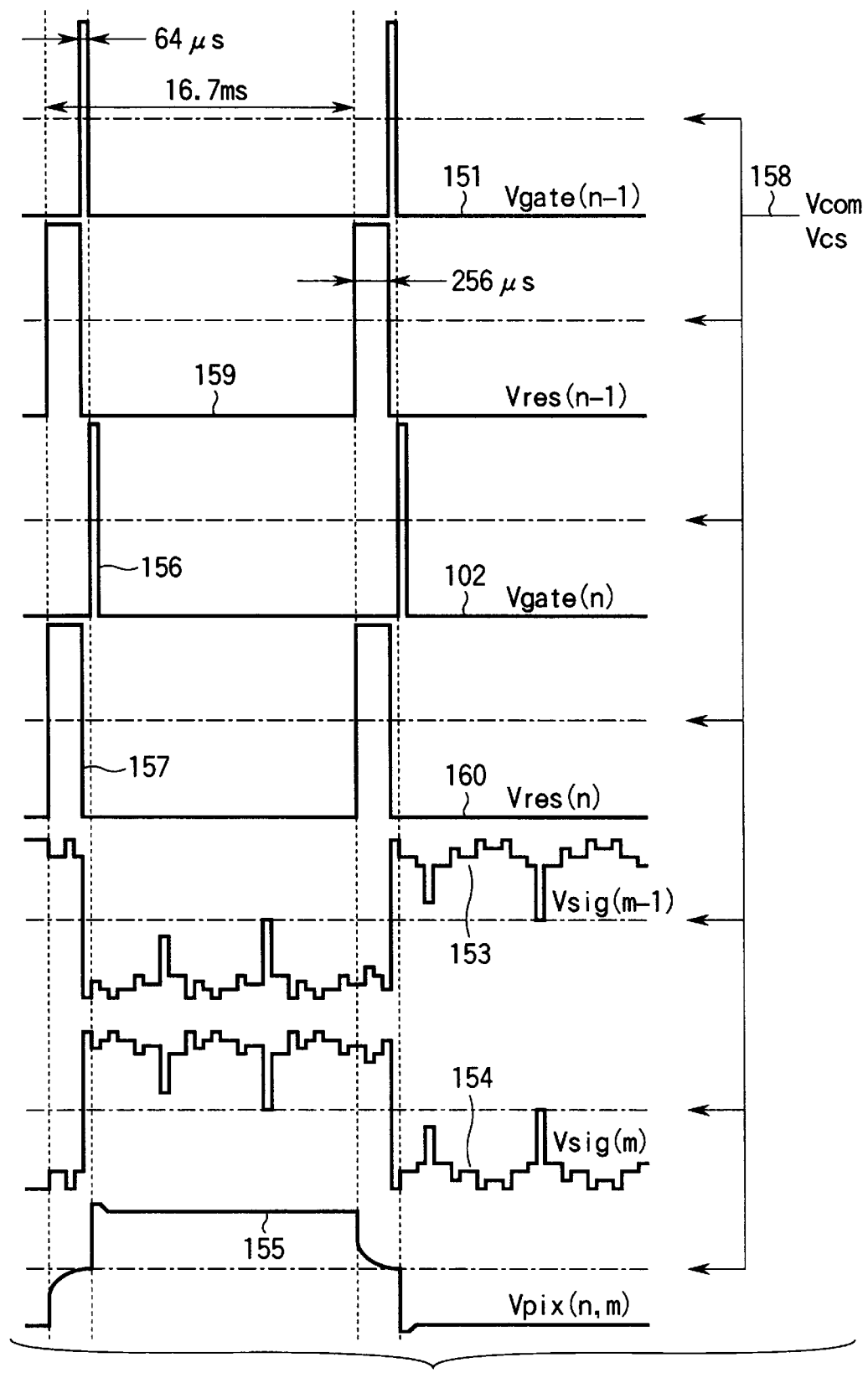
FIG. 30 shows signal waveforms for explaining the operation of the seventh embodiment device.

The second scanning line 32 of the highest portion is connected to the first scanning line 31 of the lowest portion through the bypass line 53a. As shown in FIG. 28, without connecting the first scanning line 31 of the lowest portion and the second scanning line 32 of the highest portion, the second scanning line 32 of the highest portion and the first scanning line 31 of the lowest portion may be connected respectively to first and second dummy scanning lines 35, 36.

The manufacturing method of TFT elements is same as in the first embodiment. As the liquid crystal material, deformed helix ferroelectric liquid crystal (DHF liquid crystal) B of spontaneous polarization of 100 $nC/cm^2$, response time of 90 $\mu$s, and saturation voltage of 3 V was used. The liquid crystal cell was composed of TFT array substrate and CF substrate and manufactured in the conventional method. The CF substrate had an ITO electrode, and an $SiO_2$ film was formed on the ITO electrode layer in a thickness of 80 nm by sputtering. On the ITO electrode layer of the TFT substrate and $SiO_2$ layer of the CF substrate, polyimide films of low pre-tilting performance were formed as liquid crystal alignment films. The rubbing, cell gap and other conditions were same as in the fifth embodiment.

The driving system conformed to the VGA (upper and lower two-division drive) of maximum applied voltage of ±5 V and selection time of one line of 64 $\mu$s.

In each scanning line terminal 31a–31f, driving waveform pulses 38a–38f shown in FIG. 29A to FIG. 29F were applied, and reset action and write action were conducted.

The four second scanning lines 32 connected to the same bypass line 52 are connected to four first scanning lines 31 in which pulses 38 are entered continuously, through the bypass lines 53. Therefore, four pulses 38 are entered continuously in the second scanning lines 32 connected to the same bypass line 52. That is, in the four second scanning lines 32, reset pulses of about 256 μs are entered, so that four pixel lines are reset simultaneously.

The reset action was effected by the potential Vcs of the storage capacitance line 13 fixed to the potential equal to the counter electrode potential Vcom, to set the voltage Vpix (m,n) applied to the pixel to a voltage near 0 V. For an interval between the reset action and write action, the liquid crystal continues to respond, thereby resetting almost completely.

The image signal Vsig is an alternating current about the counter electrode potential Vcom, and the image is displayed by driving by inverting the signal line to invert the signal polarity in each column, in each frame.

As a result of display, the contrast ratio was 70:1, and the response speed was 1 ms or less, and there was no after-image due to step response.

According to the embodiment, the second scanning lines are selected continuously, the reset time is sufficiently long, and moreover the conventional driving IC can be used by connecting a plurality of second scanning lines to a plurality of first scanning lines of different pixel lines.

[Eighth Embodiment]

The liquid crystal display element of the embodiment relates to a matrix layout of 640×480 pixels (VGA).

Figure 31:
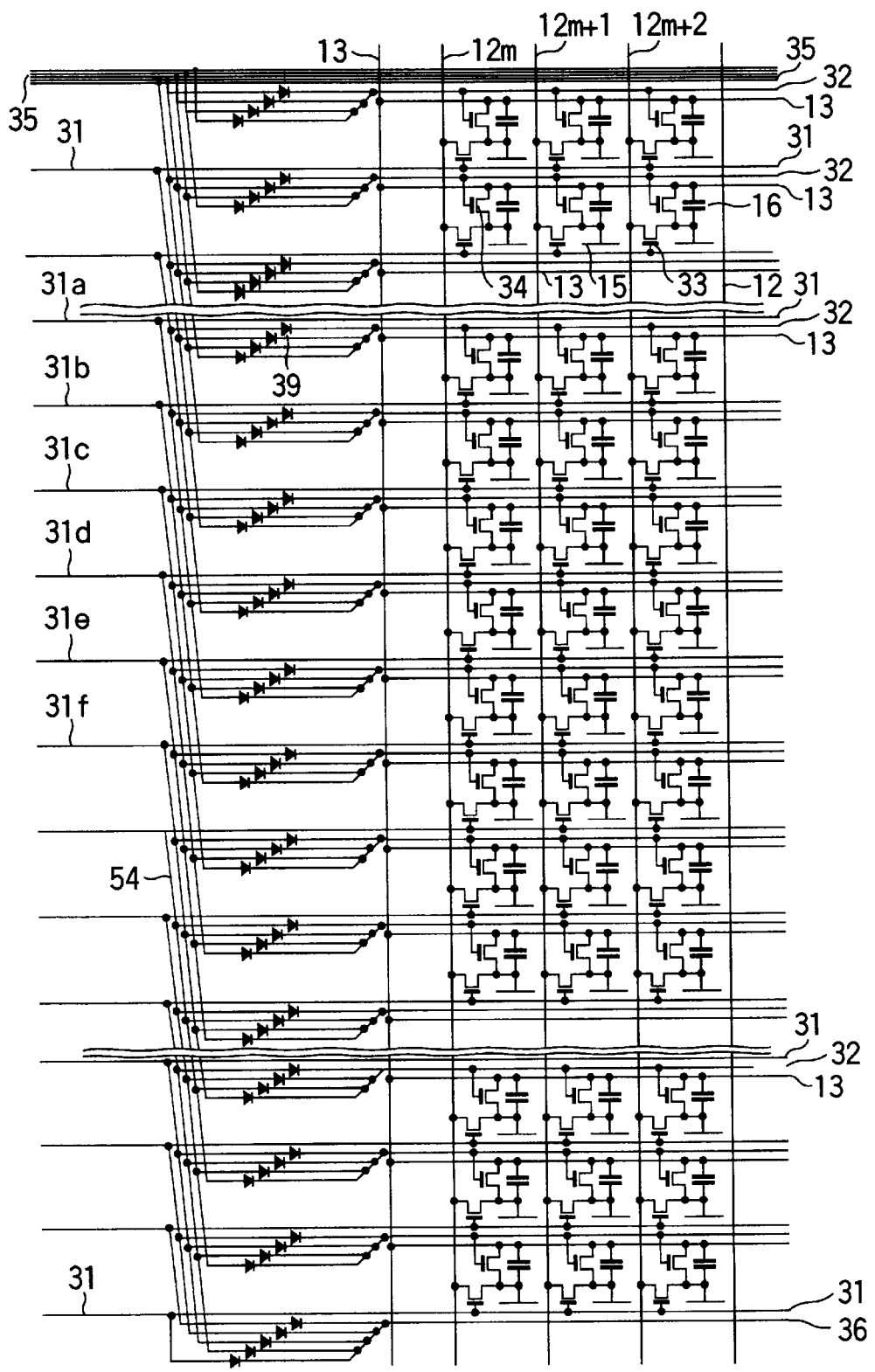
FIG. 31 is a diagram showing an equivalent circuit of a liquid crystal display device in an eighth embodiment.
Figure 32A:
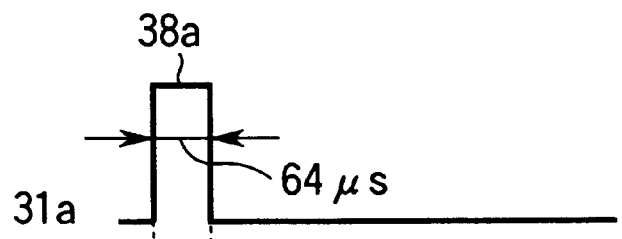
FIGS. 32A to 32F are diagrams showing input waveforms supplied to the liquid crystal display device in the eighth embodiment.
Figure 32B:
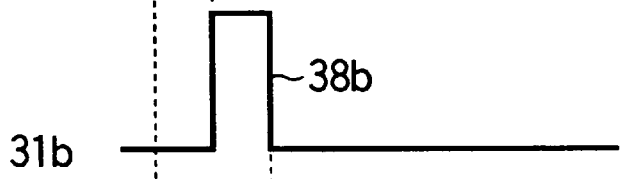
Figure 32C:
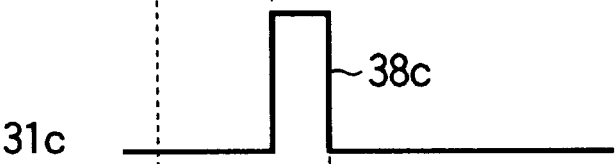
Figure 32D:
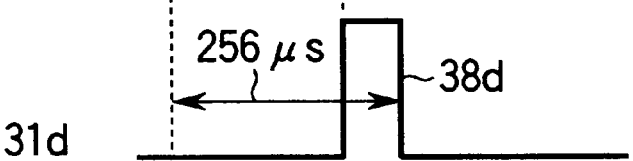
Figure 32E:
Figure 32F:
Figure 33:
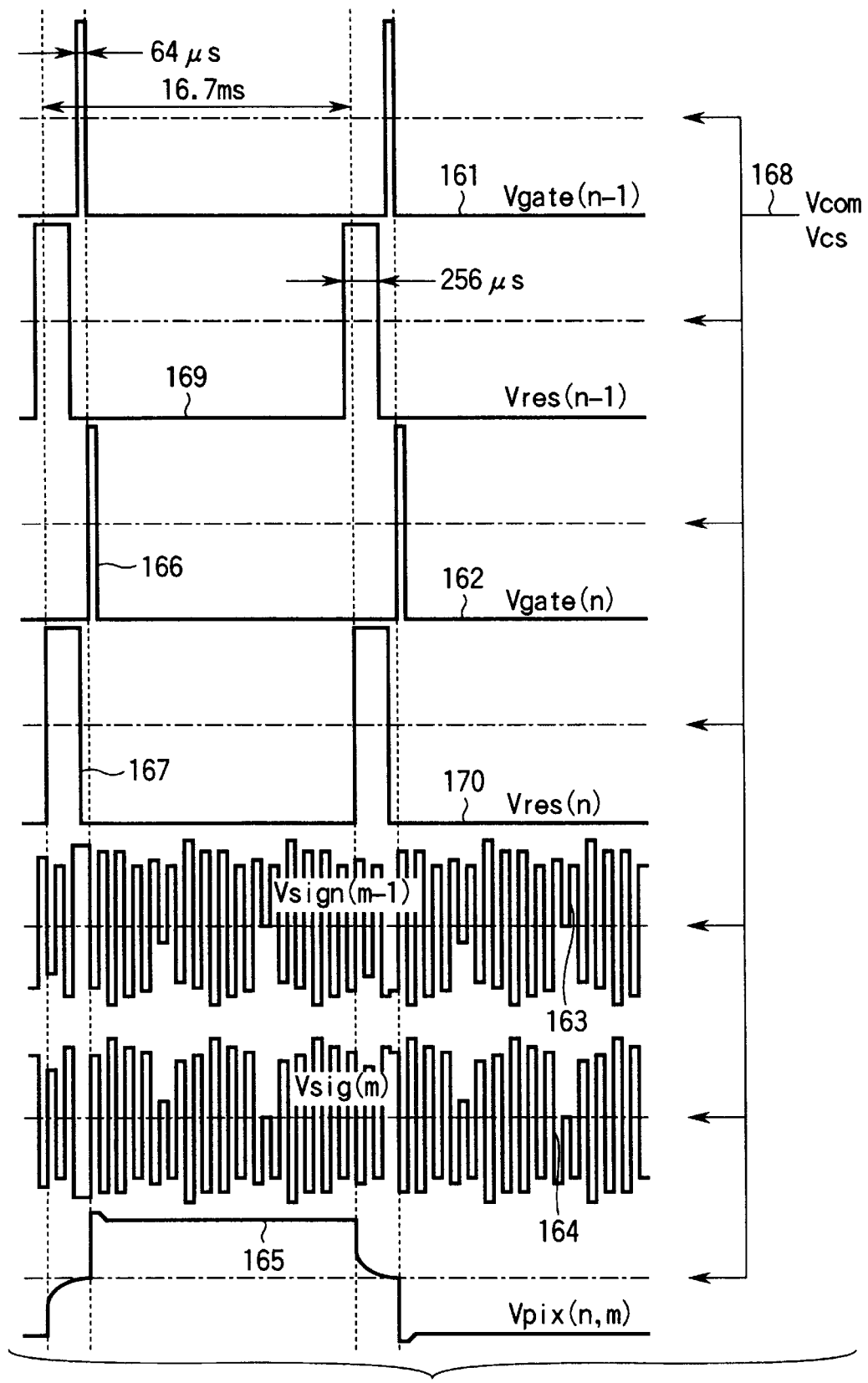
FIG. 33 shows signal waveforms for explaining the operation of the eighth embodiment device.

FIG. 31 is a circuit diagram showing an equivalent circuit of the liquid crystal display element of the eighth embodiment of the present invention. In FIG. 31, same parts as in FIG. 22 are identified with same reference numerals, and their explanation is omitted. The composition of sub-pixel group is same as in the fifth embodiment, and its illustration is omitted.

It is a feature of the embodiment that first scanning lines 31 are connected to four second scanning lines 32 of different pixel lines through bypass lines 53 with diodes 39 out of the image region. Therefore, to the second scanning lines 32, four first scanning lines 31 belonging to different pixel lines are connected. Herein, the four first scanning lines 31 connected to the second scanning lines 32 are continuously selected at the time of image display.

At the TFT array substrate end, a terminal common to the first and second scanning lines 31, 32 is provided. That is, scanning lines of pixel lines×2 lines are provided on the TFT array substrate, but the scanning line terminals are provided in the same number as the pixel lines, and it is same as in the conventional liquid crystal display consisting of one system of scanning lines.

In other method, for example, terminals at the array substrate end may be provided separately for the first scanning line 31 and second scanning line 32, and the bypass line with the diode may be provided on a peripheral circuit board to be connected to the driving IC, and the same effects as in the example above are obtained in the display properties.

The first scanning line 31 of the lowest portion and the second scanning line 32 of the highest portion are respectively connected to first dummy scanning line 35 and second dummy scanning line 36. The manufacturing method of TFT elements and cell is same as in the fifth embodiment.

The driving system conformed to the VGA (upper and lower two-division drive) of maximum applied voltage of ±5 V and selection time of one line of 64 μs. In each first scanning line 31, scanning line driving waveform pulses 38a–38f shown in FIG. 32A to FIG. 32F were applied.

When a pulse (pulse width 64 μs) 38 is entered in the first scanning lines 31, the pulse 38 is also entered in the four second scanning lines 32 connected through the bypass line 54. Therefore, in the second scanning lines 32, since the pulse 38 is entered continuously from the four first scanning lines 31 connected through the bypass line 54, pulses of pulse width of 256 (=64 μs×4) μs are applied, and the reset action is done. Besides, during input of reset pulses and write pulses, the liquid crystal continues to respond, and is reset almost completely.

The reset action was effected the potential Vcs of the storage capacitance line 13 fixed to the potential equal to the counter electrode potential Vcom, to set the voltage Vpix applied to the pixel to a voltage near 0 V.

In writing action, the image signal is an alternating current about the counter electrode potential Vcom, and the image is displayed by driving by inverting the pixel (dot inversion) to invert the signal characteristic in each pixel row and column, in each frame. The potential of the storage capacitance line 13 was constant and same as the counter electrode potential.

As a result of display, the contrast ratio was 80:1, and the response speed was 1 ms or less, and there was no after-image due to step response.

Alternatively, changing the number of pixels to 1025×768 (XGA), the TFT elements for switching and signal writing were changed to those made of poly-Si layers. The circuit configuration is same as in the embodiment, but the peripheral circuits and driving ICs in the embodiment were all mounted on the array substrate. The liquid crystal material, cell manufacturing method, and others were same as in the embodiment.

The driving system conformed to the XGA (upper and lower two-division drive) of maximum applied voltage of ±5 V and selection time of one line of 42 μs. In each scanning line 31 of the equivalent circuit, a scanning line driving waveform shown in FIG. 32A to FIG. 32F was applied, and writing and resetting actions were conducted.

In the case of XGA, the reset pulse width is about 168 μs, and the reset time is shorter than in the case of VGA, but the liquid crystal continued to respond during resetting and writing, and was hence reset almost completely.

As a result of display, the contrast ratio was 70:1, and the response speed was 1 ms or less, and there was no after-image due to step response.

According to the embodiment, the interval of the resetting action and signal writing action is identical, and the response of the liquid crystal after resetting actin is uniform regardless of pixels. Without using peripheral circuit board, by installing circuits on the array substrate, the driving circuit block can be simplified.

COMPARATIVE EXAMPLES

A cell was manufactured in the same condition as in the fifth embodiment except that the array structure was a conventional type having one TFT element, and one scanning line and signal line per pixel. By ordinary driving without resetting action, the contrast ratio was lowered to 20:1, and after-image due to step response was recognized.

Next, it was attempted to drive by resetting in the first half of the selection time of one line. Although the after-image due to step response was eliminated, the contrast ratio was only about 25:1.

As other embodiment, a cell was manufactured in the same condition by using the same array structure, cell composition, and circuit configuration as in the sixth embodiment, except for using separate, not same, terminals at the array substrate end for the first scanning lines and second scanning lines, and connecting the both scanning lines directly to the driving ICs without connecting on the peripheral circuit board. In this case, by the same driving as in the sixth embodiment, after-image due to step response was eliminated, and the contrast ratio was 70:1. Similarly, in the seventh and eighth embodiments, by making the same changes, the image was displayed in the same conditions, and similar results were obtained.

However, since the specification of the driving IC is different from the prior art, and the conventional IC cannot be used, and also the driving waveform is different, which requires development of exclusive driving circuit system and IC, and the number of necessary ICs is increased, and hence it is found that the cost is increased.

The invention is not limited to the illustrated embodiments alone. For example, in the case of reset operation by setting the potential of the storage capacitance line constant and same as the potential of the counter electrode potential, it is possible to connect wires parallel to the scanning lines same as in the prior art, or connect wires so as to intersect with the scanning lines.

In the fifth to eighth embodiments, aside from the TFT elements, TFD, MIM, and other switching elements may be also used.

The invention may be also changed and modified in various other forms within the scope not departing from the true spirit thereof.

According to the invention, as described herein, by performing resetting action and signal writing action simultaneously by having two TFT elements for resetting and for signal writing, decline of effective applied voltage is prevented, after-image due to "step response" is eliminated, and a higher contrast is obtained at a lower voltage.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device, comprising:
   a plurality of pixel electrodes arranged in matrix fashion in row and column directions;
   a plurality of scanning lines arranged in the row direction;
   a plurality of signal lines arranged in the column direction;
   a plurality of storage capacitance lines arranged in the row or/and column direction;
   a plurality of first TFT elements of a first conductivity type channel provided in correspondence with the plurality of pixel electrodes, each first TFT element being connected between a corresponding signal line and pixel electrode;
   a plurality of second TFT elements of a second conductivity type channel provided in correspondence with the plurality of pixel electrodes, each second TFT element being connected between a corresponding pixel electrode and a storage capacitance line;
   a liquid crystal layer provided close to said pixel electrodes arranged in the matrix fashion; and
   reset means for resetting the pixel electrodes by turning on said second TFT element when said first TFT element in the other row is turned on.

2. A liquid crystal display device according to claim 1, wherein said liquid crystal layer is made of a liquid crystal material of chiral smectic C phase or its sub-phase.

3. A liquid crystal display device according to claim 2, wherein said reset means includes means for turning on said second TFT element before said first TFT element in the same row is turned on.

4. A liquid crystal display device according to claim 2, wherein said first TFT element is of an n-channel type and said second TFT element is of a p-channel type; and wherein said reset means includes means for applying first a negative reset pulse to a scanning line to which gate electrodes of said first and second TFT elements are connected and for applying second a positive writing pulse.

5. A liquid crystal display device according to claim 4, wherein said plurality of scanning lines are provided with sequential reset pulses overlapping partially with each other.

6. A liquid crystal display device according to claim 4, wherein said p-channel and n-channel TFT elements are commonly connected to a scanning line.

7. A liquid crystal display device according to claim 2, wherein said storage capacitance lines are connected separately to a storage capacitance line driving circuit.

8. A liquid crystal display device according to claim 4, wherein said second TFT element has one end connected to a pixel electrode provided in a corresponding pixel region and another end connected to a storage capacitance line of an adjacent row line.

9. A liquid crystal display device according to claim 4, wherein said n-channel TFT element is connected to a scanning line which is first selected and said p-channel TFT element is connected to another scanning line which is then selected.

10. A liquid crystal display device, comprising:
    a plurality of pixel electrodes arranged in matrix fashion in row and column directions;
    a plurality of scanning lines arranged in the row direction comprising separately formed a plurality of reset scanning lines and a plurality of writing scanning lines;
    a plurality of signal lines arranged in the column direction;
    a plurality of storage capacitance lines arranged in the row or/and column direction;
    a plurality of first TFT elements provided in correspondence with the plurality of pixel electrodes, each first TFT element being connected between a corresponding signal line and pixel electrode and controlled by a correspondence writing scanning line;
    a plurality of second TFT elements provided in correspondence with the plurality of pixel electrodes, each second TFT element being connected between a corresponding pixel electrodes and a storage capacitance line and controlled by a correspondence reset scanning line;
    a liquid crystal layer provided close to said pixel electrodes arranged in the matrix fashion; and
    reset means for resetting the pixel electrodes by turning on the second TFT element when the first TFT element in the other row is turned on.

11. A liquid crystal display device according to claim 10, wherein the liquid crystal layer is made of a liquid crystal material of chiral smectic C phase or its sub-phase.

12. A liquid crystal display device according to claim 11, wherein the reset scanning line and writing scanning line connected to first and second driving circuits, respectively and wherein the second TFT element provided in the respective pixel regions is supplied with a reset pulse from said first driving circuit via said reset scanning line and then supplied with a writing pulse from said second driving circuit via said writing scanning line.

13. A liquid crystal display device according to claim 11, further comprising means for connecting the reset scanning line in a first row line and the writing scanning line in a second row line provided apart from said first row line by several row lines, wherein a predetermined writing and resetting pulse signals are supplied to said connecting means.

14. A liquid crystal display device according to claim 13, wherein said connecting means includes a diode.

15. A liquid crystal display device according to claim 11, wherein said reset means includes means for turning on said second TFT element before said first TFT element in the same row is turned on.

16. A liquid crystal display device according to claim 12, wherein said plurality of scanning lines are provided with sequential reset pulses overlapping partially with each other.

17. A liquid crystal display device according to claim 11, wherein said storage capacitance lines are connected separately to a storage capacitance line driving circuit.

18. A liquid crystal display device according to claim 11, wherein said second TFT element has one end connected to a pixel electrode provided in a corresponding pixel region and another end connected to a storage capacitance line of an adjacent row line.

* * * * *